United States Patent

Curran

[15] 3,648,718

[45] Mar. 14, 1972

[54] VALVE STRUCTURE

[72] Inventor: John R. Curran, Attleboro, Mass.

[73] Assignee: The Foxboro Company, Foxboro, Mass.

[22] Filed: June 1, 1970

[21] Appl. No.: 42,426

[52] U.S. Cl...................137/269, 137/315, 137/625.37, 251/210, 251/282
[51] Int. Cl................................................F16k 39/00
[58] Field of Search..............251/282, 362, 356, 367, 210; 137/625.3, 625.35, 625.33, 625.37, 454.6, 315, 269

[56] References Cited

UNITED STATES PATENTS

| | | | |
|---|---|---|---|
| 1,493,293 | 5/1924 | Timberlake | 251/356 X |
| 1,807,446 | 5/1931 | Smeby | 137/625.37 |
| 3,454,035 | 7/1969 | Jespersen | 137/454.6 X |
| 3,521,667 | 7/1970 | Johnson | 137/454.6 |
| 3,572,382 | 3/1971 | Luthe | 137/625.35 |
| 2,895,495 | 7/1959 | Bryant | 137/315 |

Primary Examiner—Henry T. Klinksiek
Attorney—Lawrence H. Poeton

[57] ABSTRACT

For use in the control of flow in industrial instrumentation with respect to process or energy systems, valve aperture structure produced through CAD (Computer Aided Design), with performance support in the form and dimensioning of valve interiors; featuring case and simplicity of assembly, disassembly, and maintenance of valve structure through nested cage combinations; with valve structure lending itself to a product line of different types and sizes of valves with element interchangeability reducing the necessary number of elements; resulting in superior performance through the above and other features; sub-assemblies included are a double-cage noise reducer, a cooling system for use in bonnets, a bonnet packing renewal device, and a three-way valve body and plug combination.

30 Claims, 45 Drawing Figures

Patented March 14, 1972

INVENTOR.
JOHN R. CURRAN

BY
Lawrence H. ...
AGENT

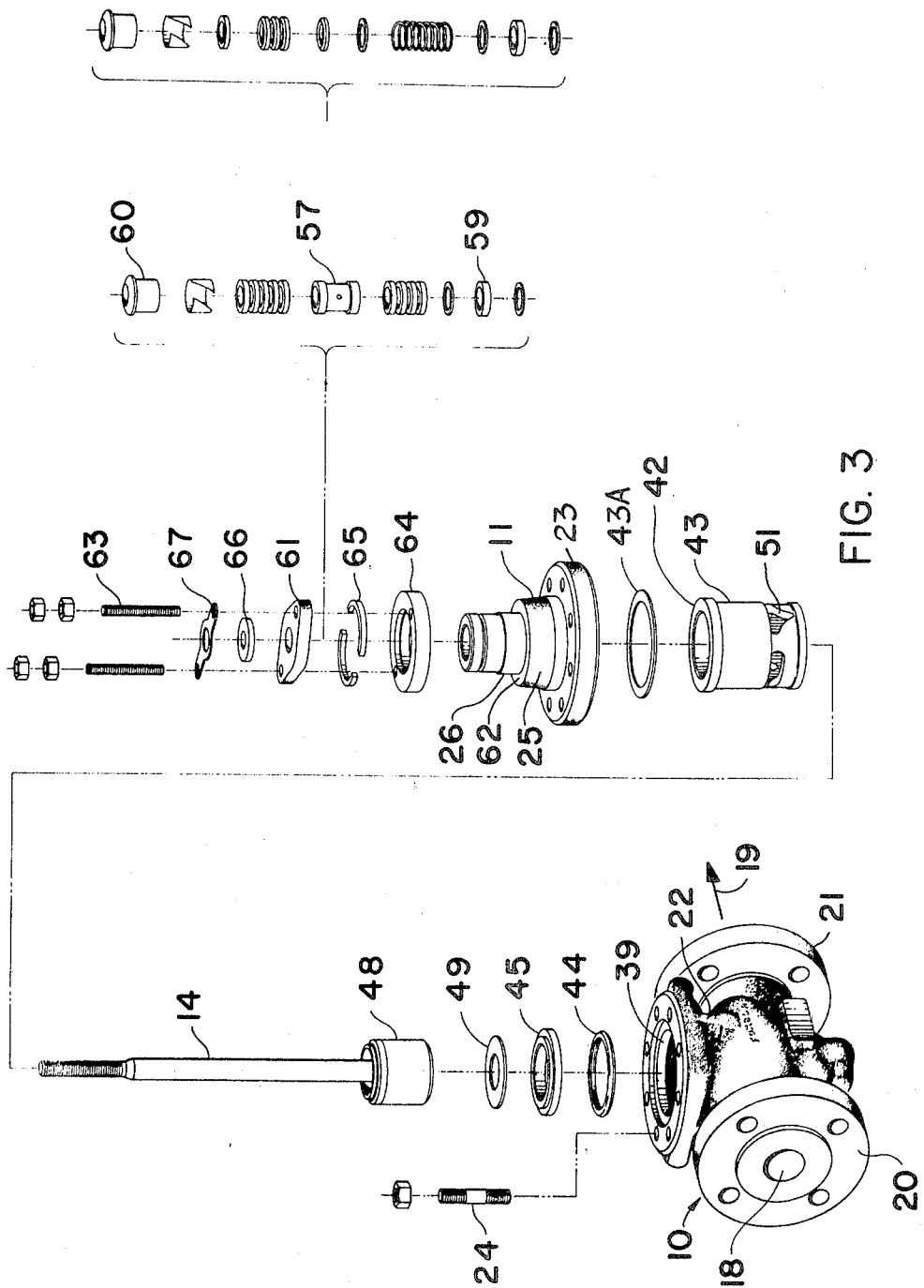

FLOW

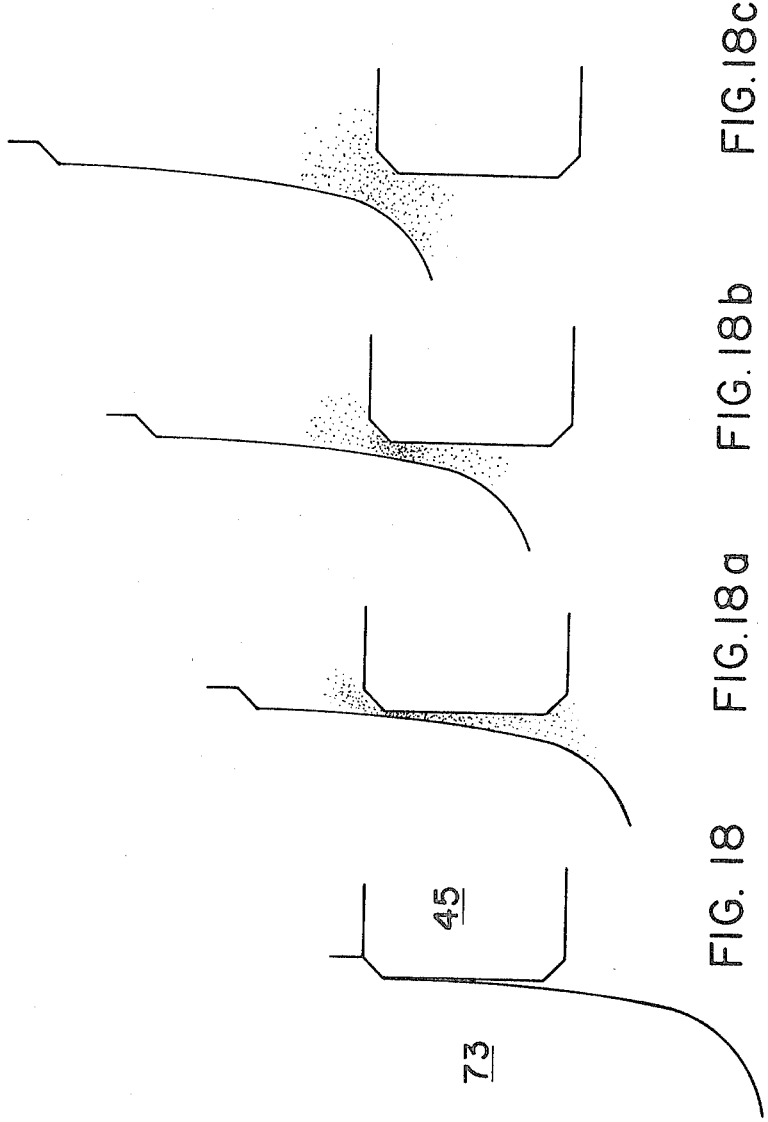

VALVE STRUCTURE

This invention relates to control valves as used in the control of gaseous, vaporous, and liquid fluids as well as flowable solids and suspensions, in industrial instrumentation with respect to process or energy systems. It particularly relates to improvement in the structure of such valves, such improvement being in the nature of invention for improved performance, and in the sense of valve structure unique to a product line of valves. One example of the area of concept of this invention is in diaphragm actuated, rising plug types of control valves suitable for use as final control elements in automatic control systems.

The art of fluid control by valves of this nature is many years old, and is replete with various forms of valves for different applications and purposes. Each of such forms has been provided in many structural variations, according to need, opportunity, and the leanings of designers.

Such prior art valve structures have been provided, by today's standards, with roughly calculated and designed aperture configuration and with approach, departure and other passages and chambers for the aperture provided on rough basis of sufficiency. Each valve structure has been essentially individual, and product lines of valves included many valve units, with parts specific to each unit, with minimal interchangeability. The number of different types and sizes of valves necessary to provide an effective product line with full choice for all applications, even as considered for one general type of valves, such as plug valves, has been large and costly. Sales and manufacturing problems of the seller of valves have been matched only by the problems of a buyer, in terms of selection, application, maintenance, and repairs.

Such prior art valve structures, further, have not been marked by advantageous considerations of assembly, disassembly, parts replacement and other maintenance, in terms of product line and trim change considerations.

Modern requirements for valves of such nature, have escalated in terms of need for greater precision, product lines with greater interchangeability and consequently significantly fewer parts, and improved structure in terms of ready assembly and disassembly to provide ease and reduced costs in manufacture, service, and repair.

A further, modern requirement in consideration of valve structure design is that "noise" is increasingly significant as a factor to contend with. This is noise, usually audible, created by fluid moving through valve structures. There are levels of noise which are acceptable, and these may be plotted by coordinates of noise intensity versus noise frequency. For example, high frequency noise is not necessarily objectionable at low intensity. But high frequency noise at high intensity becomes a scream. Ultrasonic situations pose further problems. Also, low frequency noise is usually not objectionable, but in high intensity situations it can be unacceptable. Noise must further be minimized in its effect on measurements in valved systems.

The present invention provides valves for use individually and in valve product lines, which are maximal in performance under modern day conditions and requirements of industrial instrumentation; which are readily serviceable, repairable, and adapted for ease of assembly and disassembly, whether at the factory or in the field; and which lend themselves to a simple product line, with such interchangeability as to application and size, as to make available a full product line with significantly reduced numbers of items necessary to be held in stock, and providing ease and simplicity of choice by a purchaser without reduction of process or situation applicability.

This invention provides, further, valves in which the operating apertures, in terms of valve plug shape and contour, cage aperture shape and contour, and the like, are produced by CAD (Computer Aided Design). This is accomplished in a manner and to a degree which is special to this invention and which provides highly precise structures with actual curvilinear forms produced by dimensioned steps, such as machine tool cutter guidance, or casting mold formation, of the increment order of one ten-thousandth of an inch.

Further, in this invention, passages input to the valve seat (aperture) area, and passages output from this area, are designed in terms of increase and decrease in size, with maximal size change while producing essentially streamlined situations, to present and remove fluid to and from the aperture area without detracting from the effectiveness of the computer aided design.

Further, such passages are formed in aid of noise reduction by the streamline and full flow minimal turbulence formation. The output passages are provided with sufficient depth to avoid excess wear by impingement of flow directly from the aperture area to a valve wall. This depth provides an in-depth body of fluid as buffer to such direct flow.

The superior performance of valve structures according to this invention is a function of the combination of computer designed apertures, supported by associated flow passages and chambers in such size, form and location as to be in aid of the precision of the apertures, in combination with various new structural features such as improved valve cage assemblies, yoke connections, valve stem and plug assemblies, simple trim change structures, and the like.

The improved serviceability, interchangeability, ease and simplicity of assembly and disassembly, and the product line simplicity of the valves according to this invention are functions of the various new structural features mentioned above.

The noise reduction feature according to this invention is at least in part a function of the form, size and location of the input and output passages and inner chambers of the valves.

Examples of computer aided design in valves according to this invention are in the shape and contour of the plug in stem guided valves, and of the cage apertures in cage guided valves.

These contours are determined according to a desired relationship curve between valve stem lift and fluid flow through the valve where $C_v$ is the capacity rating—the number of U.S. gallons per minute of water discharged through a wide-open valve subjected to a pressure drop of 1 p.s.i. The desired relationship curve is a theoretical $C_v$ percentage curve which represents matching coordinates of flow versus valve stem position.

Such a theoretical, desired condition, $C_v$ percentage curve is fed into a computer as a reference curve. The computer is given directions in terms of valve stem movement increments. At each such increment, the computer references to the $C_v$ value of the reference curve at that point, and determines the valve aperture area necessary to achieve the designated output volume of fluid.

The computer works, for example with liquids, on the formula $A = C_v/(38 \cdot SF)$ wherein $A =$ the desired area, $C_v =$ the percentage $C_v$ value of the particular stem position, "38" is a "constant" constant and $SF$ (Spink Factor) is a variable constant. This formula is derived from the base flow formula for liquids: $Q = SF \cdot A \sqrt{2gh}$ where $Q =$ flow volume; $SF =$ Spink Factor; $A =$ valve aperture area; $g =$ gravity (acceleration); and $h =$ head. The $SF$ factor is essentially empirical, based on experience and knowhow and relates to the actualities of a particular flow situation. It is the adjustment factor between actual and theoretical performance of a valve.

In the case of a plug type valve, the valve aperture area thus determined is the ring area between a fixed annular valve seat and different circumferential lines on the plug for different valve stem-plug positions. From the changing area findings, in terms of stem movement, the computer is further used to produce X, Y coordinates of the curve of the line curve of the valve plug face in a cross section of the plug. A valve plug is then constructed according to these coordinates.

To the extent that it is necessary, test results of such a constructed plug are compared with the $C_v$ percentage (theoretical) curve that was initially fed into the computer. By adjusting the SF element of the formula, this iteration may be continued until the desired degree of refinement is reached.

One procedure which may be followed is to produce the X, Y coordinates on a tape and to produce a valve plug template in a machine tool from this tape. Thereafter, the template may be used in a machine tool to turn out highly precise valve plug formations according to the computer design.

The precision valve aperture formations according to this invention are supported in their operation by flow passages from the upstream pipe line connection to the aperture which increase in volume, without regression, from the pipe line to the valve aperture. The passages from the valve aperture to the downstream pipe line connection decrease in volume, without regression. The chambers in the valve body adjacent the valve aperture are deep, in aid of full performance of the valve aperture. The chamber about the immediate exit of the valve aperture is of sufficient depth to significantly reduce direct jet impingement on the inner valve body wall, to reduce wear, and to diminish cavitation. The fullness of volume of these inner passages and chambers in maximal, within the dimensional limits of the valve body, and the volumetric changes in the input and output passages are provided as maximal within limits necessary for best possible streamlining, to support the precision performance of the valve aperture with minimal turbulence.

Improved serviceability, interchangeability, ease and simplicity of assembly and disassembly, product line simplicity, and significantly superior operational performance of valves according to this invention, are provided at least in part by structural factors, as follows, and taken in various combinations: a cage device in each type of valve; valve seat assembly in which the cage device is used to hold the valve seat member(s) in place through assembly pressure on the cage device by the valve bonnet; a valve seat sealing ring of edge contact metal stripping; no cementing. Trim change means for converting a cage guided valve to a stem guided valve; operational size change means involving changing the valve seat ring and plug and stem assembly, or, in the same bonnet and body combination, changing the packing and gland to accommodate different sizes of valve stems; a special permanent assembly of valve plug to valve stem, and in cage-guided structures, of valve cage plug to valve stem, to avoid disassembly by vibration; special bonnet forms in terms of yoke assembly thereto in that bonnets of different sizes receive the same size yoke; simple and versatile assembly structure of yoke and top packing gland assembly to the bonnet; a wiper assembly for the upper portion of the stem to avoid dirt pockets; simple means for incorporating soft seats in the valves; simple and effective slip-on sealing means for the top end of the valve plug in a cage guided valve; a single seat valve that is suitable for relatively high pressures without leakage; trim change to reduced area by using same size valve and changing such items as the cage, the stem and plug assembly, and the seat assembly.

The entire valve system lends itself to the use of inexpensive metals in non-critical areas; to the capability of reducing valve aperture area while keeping the same stem and plug assembly; to noise reduction so that in both full and reduced area assemblies the operation is full and silent. Flow passage holes in the support cages are designed as desired, for either or both equal percentage or linear operation; the actuator may be removed without disturbing the stem packing; in shipping and handling, the yoke is part of the valve body assembly. Thus the stem is protected against bending during shipment, and the yoke is a handle for use in moving the valve about and in and out of packaging. In all cases, a protective cage is provided around the valve plug. For accurate operation and seating, the stems are guided both top and bottom and for non-critical assembly of actuator and stem, an adjustable coupling is provided. Further features of this invention include: the same flow rates are obtained for a given size valve with full area trim, for both stem and cage-guided types, balanced or direct, whether set up with percentage or linear characteristics; serviceability with simple tools and simple service steps, the same bonnet can be used with different size stems, using different size packing; and in stem guided types, a cage is used to hold the valve seat in place. In the valve operation, no fluid is displaced, there is no dashpot action, there is no galling or sticking. Dirty chemicals can be readily controlled without difficulties.

In illustration of a valve product line incorporating valve features according to this invention, there is described herein one form of each (1) a stem-guided plug valve, (2) a cage-guided, balanced valve, and (3) a needle-trim valve. The plug valve is for general use, the cage-guided valve is for slurries and the like, and for balanced design where strong forces are involved; and the needle-trim valve is for small flows.

This invention, therefore, provides valve structures and systems of superior structure and performance in the context of product line simplicity: fewer parts for a full product line, simple choice situations for various applications in that both buyer and seller have easy comprehension as to choices, without reduction of choices, shelf stock items reduced in number, and such simple design and structure as to make extensive training of salesmen or servicemen unnecessary. The valve product line of this invention may be thought of as an erector set of building blocks from which many specific valve application structures may readily be produced.

This invention is in terms of product line valves of computer-aided design, with support of such design in the volume and form of the valve passages and chambers; cage assemblies, bonnet top assembly as related to yoke and stem mounting; and other structural features such as replaceable soft seat ring and unitary assembly of valve stem and valve plug.

Sub-assemblies included are a double-cage noise reducer, a cooling system for use in bonnets, a bonnet packing renewal device, and a three-way valve body and plug combination.

Other objects and advantages of this invention will be in part apparent and in part pointed out hereinafter and in the accompanying drawings, wherein:

FIG. 3 is an exploded view of the structure of FIG. 2, as if FIG. 2 were whole, with a showing of alternative sets of valve stem packing;

FIGS. 17–17c and 18–18c are schematics of cage and plug type valve apertures and computer aided design forms according to this invention;

FIGS. 20–20h are schematics of valve body form and dimension according to this invention;

In presentation of a valve concept of this invention, that of providing a building block product line system of fewer and more interchangeable elements, the illustrative structure set forth herein embodies, with some variations, three types of valves. A product line according to this invention does not necessarily include all of these types, nor does it exclude other types.

These are a cage-guided valve; a stem-guided plug valve; and a needle-trim stem-guided plug valve.

Figure 8:
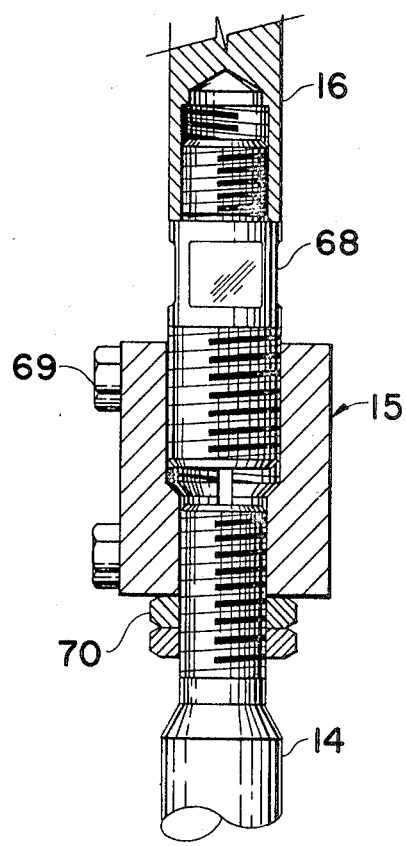
FIG. 8 is a showing of a valve stem coupling with an actuator shaft for use in valve assemblies according to this invention.
Figure 9:
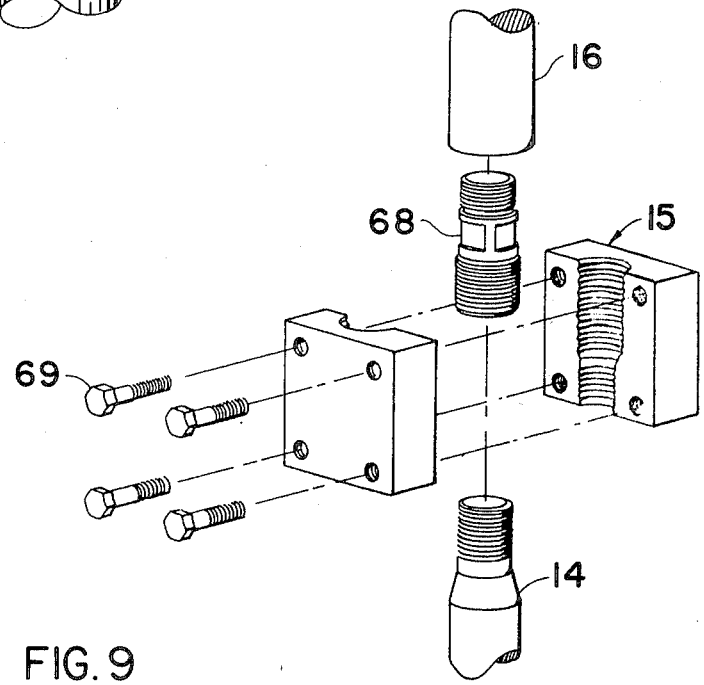
FIG. 9 is an exploded view of the valve stem coupling assembly of FIG. 8.
Figure 10:
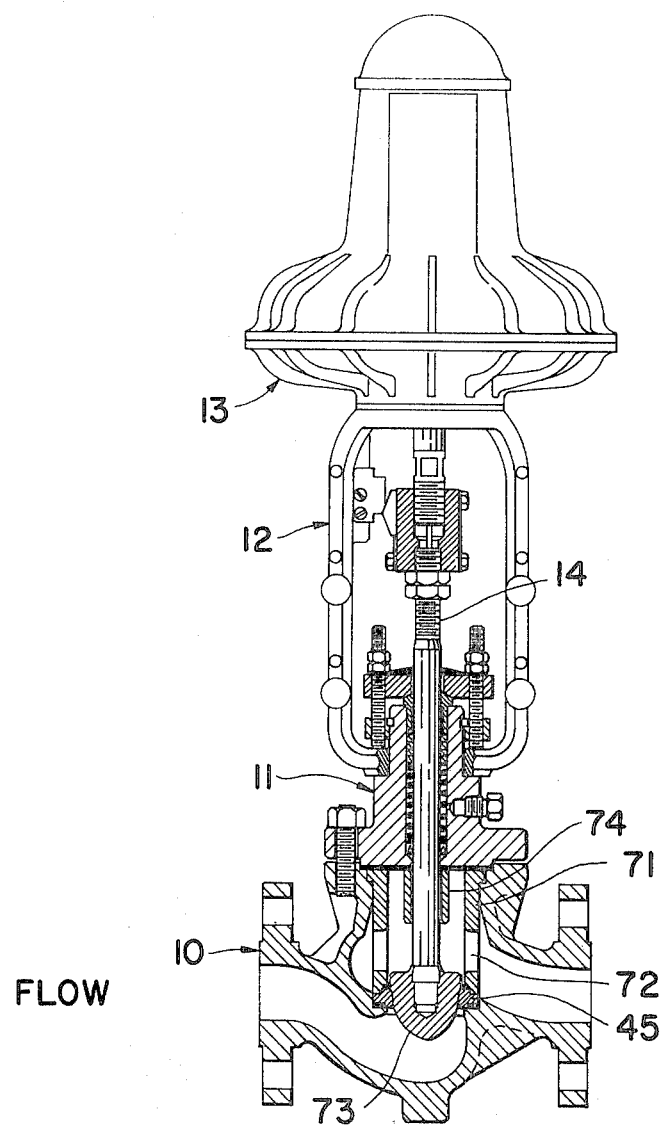
FIG. 10 and 10a are vertical central sections of a stem-guided plug valve according to this invention.
Figure 10A:
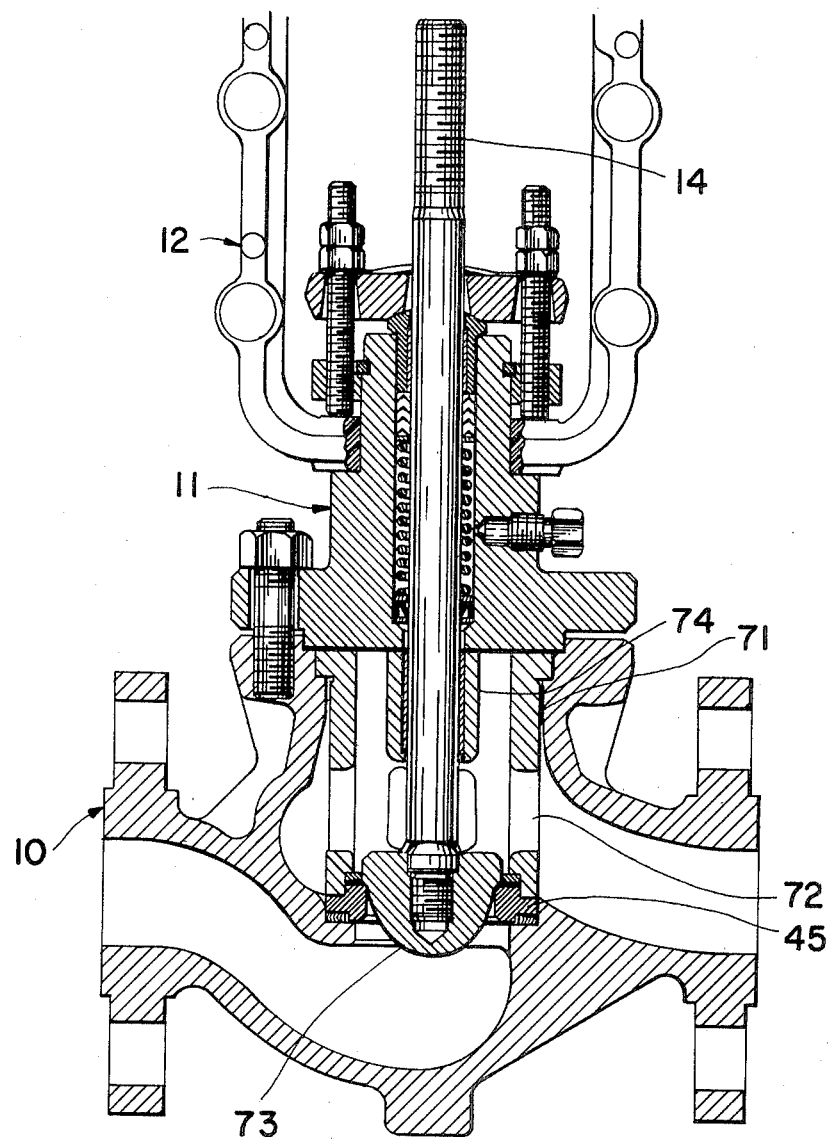
Figure 11:
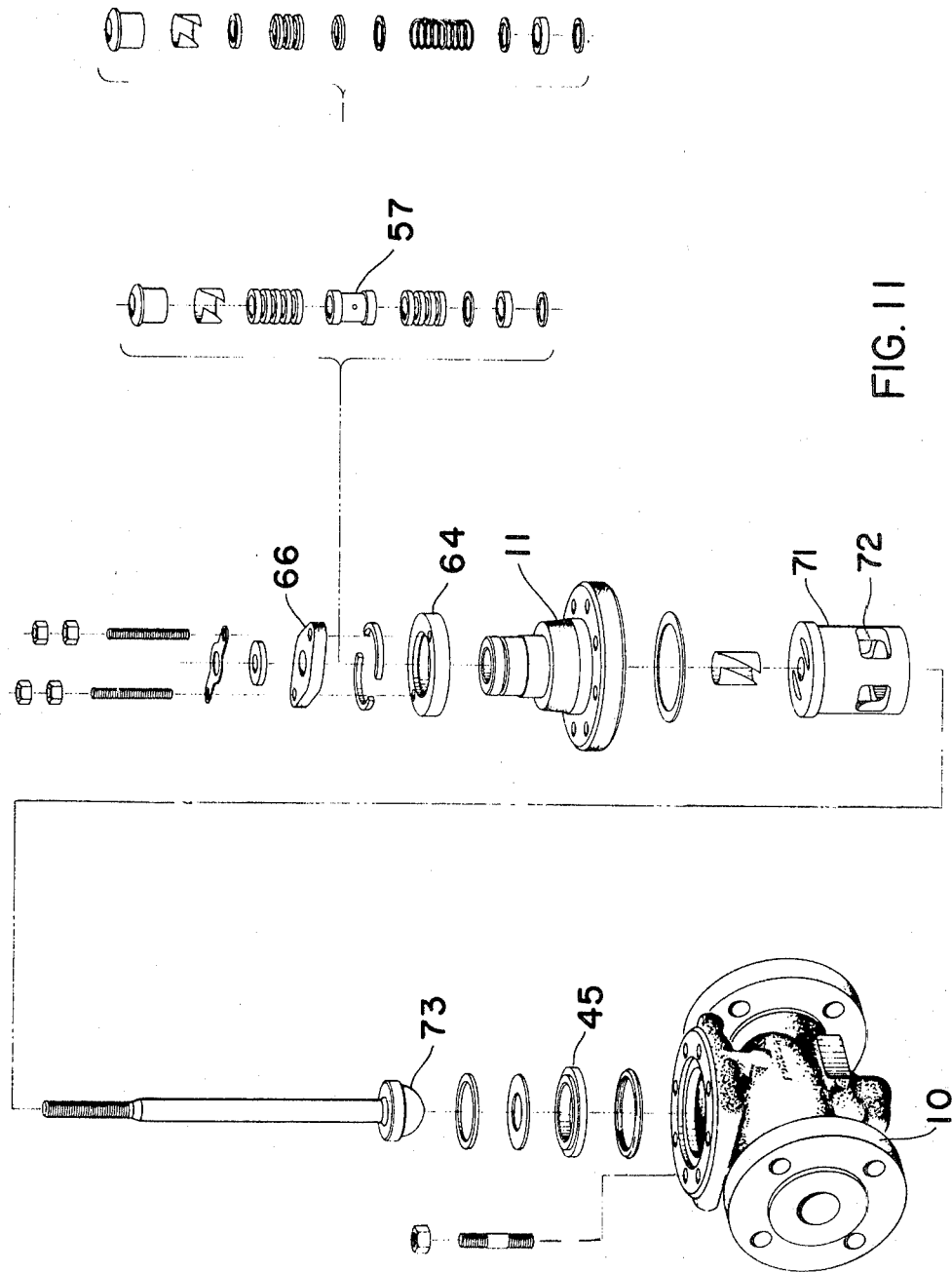
FIG. 11 is an exploded view of the structure of FIG. 10, as if FIG. 10 were whole, with a showing of alternative sets of valve stem packing.
Figure 12:
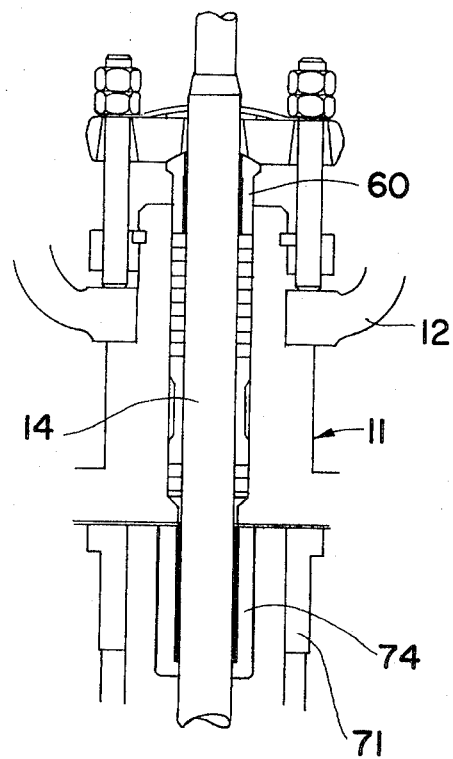
FIG. 12 is a detail of the valve stem guidance of FIGS. 10 and 11.
Figure 13:
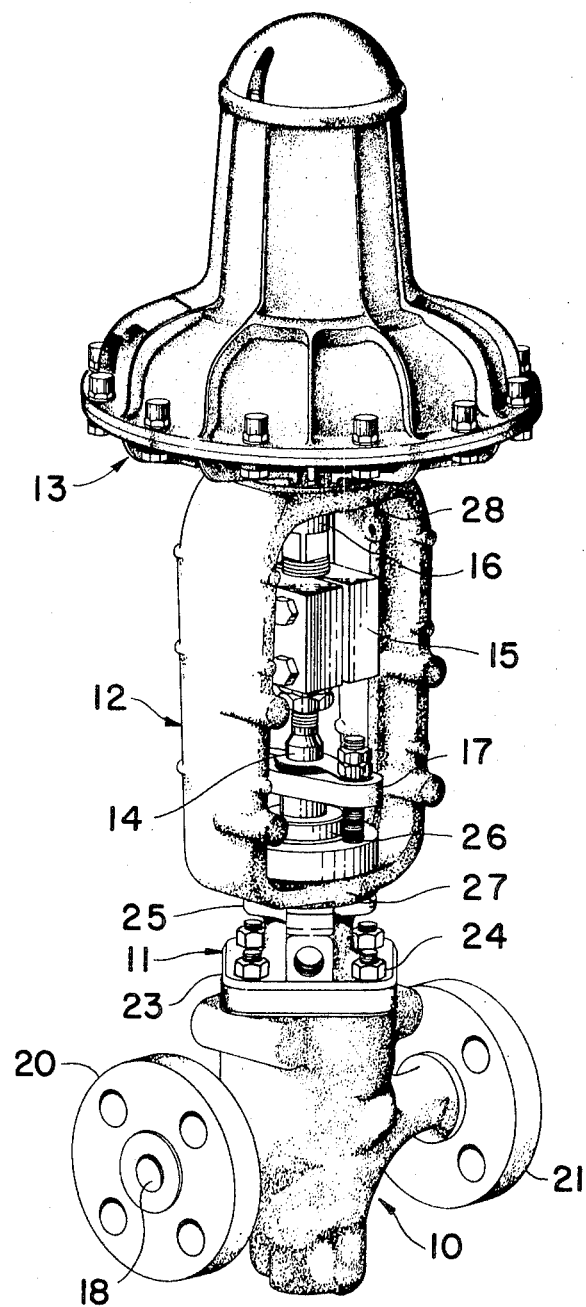
FIG. 13 is an overall external perspective of a valve assembly according to this invention of the needle-trim stem-guided plug type, including a valve actuator.

In the drawings, FIGS. 1 through 9 deal primarily with a cage-guided valve; FIGS. 10 through 12 primarily with a stem-guided plug valve; and FIGS. 13 through 15 primarily with a needle-trim, stem-guided plug valve.

Many features are common to the three illustrative types of valves set forth herein. Each valve assembly comprises a valve body, a bonnet, a yoke for mounting with a valve actuator, and, internally, a valve stem and plug assembly with a valve seat held in place through a cylindrical sleeve cage, as held against the valve seat by the bonnet.

The valve control apertures in each example are provided through valve forms contoured in accordance with computer aided design. Each of the valve bodies is provided with streamline input and output flow passages in volumetric magnitude and design in aid of the operation of the valves in controlling flow through the precisely calculated and formed valve form apertures. Each of the valve bodies, in combination with their respective bonnets and their valve stem and plug assemblies, is provided with special quick change assembly combinations of seat ring and cage elements which lend themselves to use with different valve forms as well as to simple trim changes, including change from hard to soft seat valves and the reverse. Special assemblage of the yoke and packing gland is also common to the several valve types disclosed herein, and common yoke assembly means is provided for various sizes of the valves. These common features, plus others disclosed hereinafter and in the drawings, provide the basis for a simple building block product line of fluid flow control valves with fewer elements providing a full line of valves for a substantial variety of applications, while at the same time providing significantly superior performance.

Figure 1:
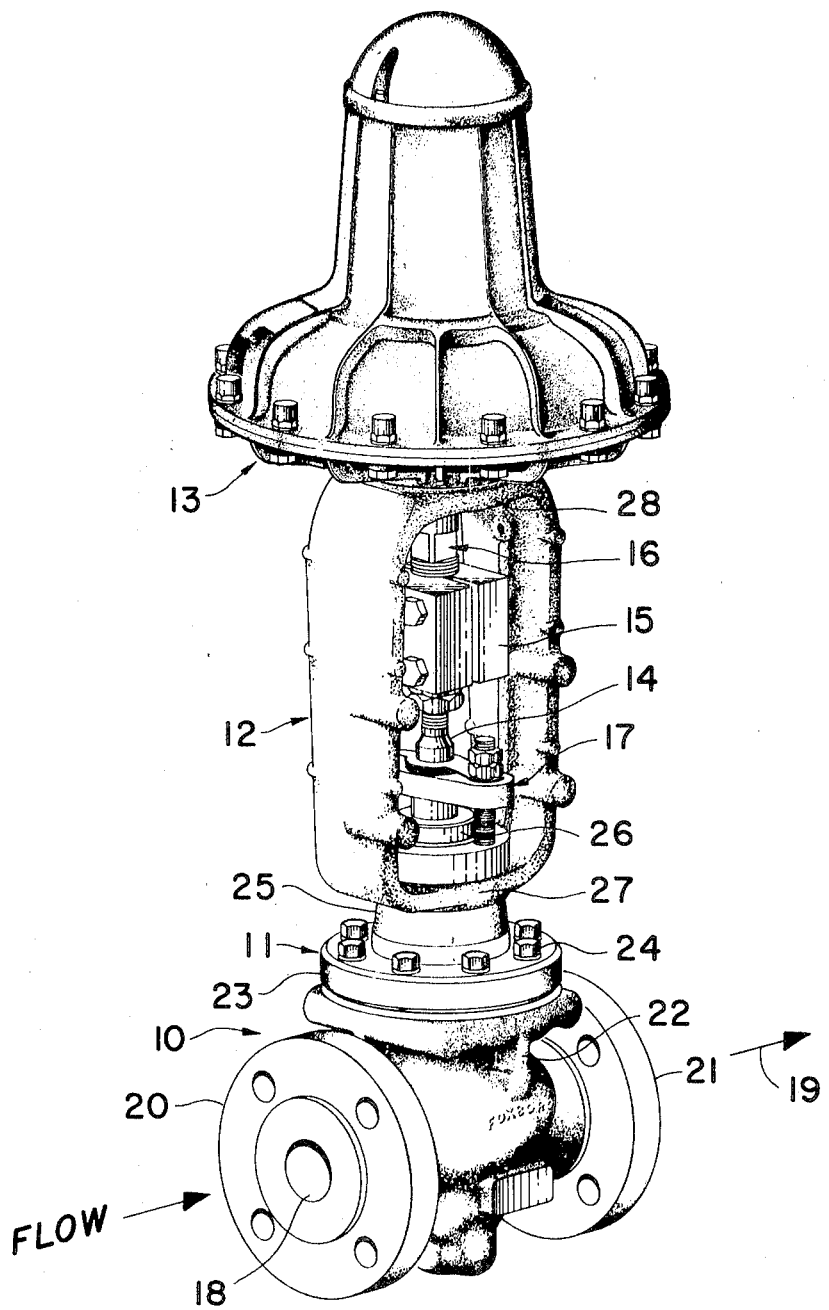
FIG. 1 is a overall external perspective of a valve assembly according to this invention of the cage-guided or stem-guided plug type, including a valve actuator.

In the cage-guided valve form illustrated in FIGS. 1 through 9, the FIG. 1 showing comprises a valve body 10, a bonnet 11 mounted on the body 10, a yoke 12 mounted on the bonnet 11 and supporting a pneumatic valve actuator 13. A valve stem 14 is shown as it appears within the yoke 12, with a connection assembly 15 of the stem 14 to an actuator shaft 16 from the actuator 13. The yoke and packing gland assembly to the bonnet is generally indicated at 17.

In this overall structure, the body 10 provides a flow-through passage from an input 18 to an output indicated by arrow 19. Through flanges 20 and 21, the valve body is connected into a flow pipe line (not shown) to incorporate the flow-through passage of the valve body into the flow pipe line. Within the body 10, as will be seen hereinafter, means is provided for controlling flow through the pipe line, by means of variable size aperture forms. The outer contours of the valve body 10 are curved to provide maximum internal effectiveness with minimal body weight and yet with sufficient body strength to withstand the forces to which valves are subject in modern day demanding applications. Suitable body ribs as at 22 are provided to add to body strength where needed. The top of the body is provided with a flange base on which the bonnet 11 is mounted, and through which the valve stem enters the body 10.

The bonnet 11 is in the form of a stepped cylindrical sleeve body. The base is broad and developed into a flange 23 through which bolts 24 secure the bonnet to the valve body 10. The first step is radially inward to an outside central diameter at 25, and the second step is again radially inward to a lesser outside diameter at 26 to receive the ring base of the yoke 12. This same yoke diameter is provided on bonnets for various sizes of valves to provide increased interchangeability in valve elements such that a valve product line of minimal numbers of different parts is accomplished. The interior of the bonnet is a through-passage for the valve stem 14.

The yoke 12 is a supporting connector between the valve body-bonnet assembly and the valve actuator 13. It is in the form of an essentially rectangular frame with a base ring 27 in sliding fit over the top of the bonnet and resting on the bonnet step formed by the smallest outside diameter of the bonnet. The yoke has a top ring 28 bolted to the under side of the actuator 13. The yoke base ring is held in place by the assembly 17 detailed later herein and involving the bonnet packing gland. The length of the yoke provides space needed to accommodate the actuator shaft 16 and the top of the valve stem 14 in the connection assembly 15 which ties these shafts together, end-to-end. The yoke top ring 28 is bolted to the actuator 13 through slots to aid in matching the end-to-end assembly of the shaft 16 and stem 14.

The actuator 13 is an air operated device for moving the valve stem to vary the size of the flow aperture passage in the valve body. It comprises a diaphragm 29, a pressure chamber 30, and a return spring 31. The actuator shaft 16 is secured to the diaphragm 24, and an air signal inlet 32 feeds motive force into the chamber 30. See FIG. 2.

Figure 2:
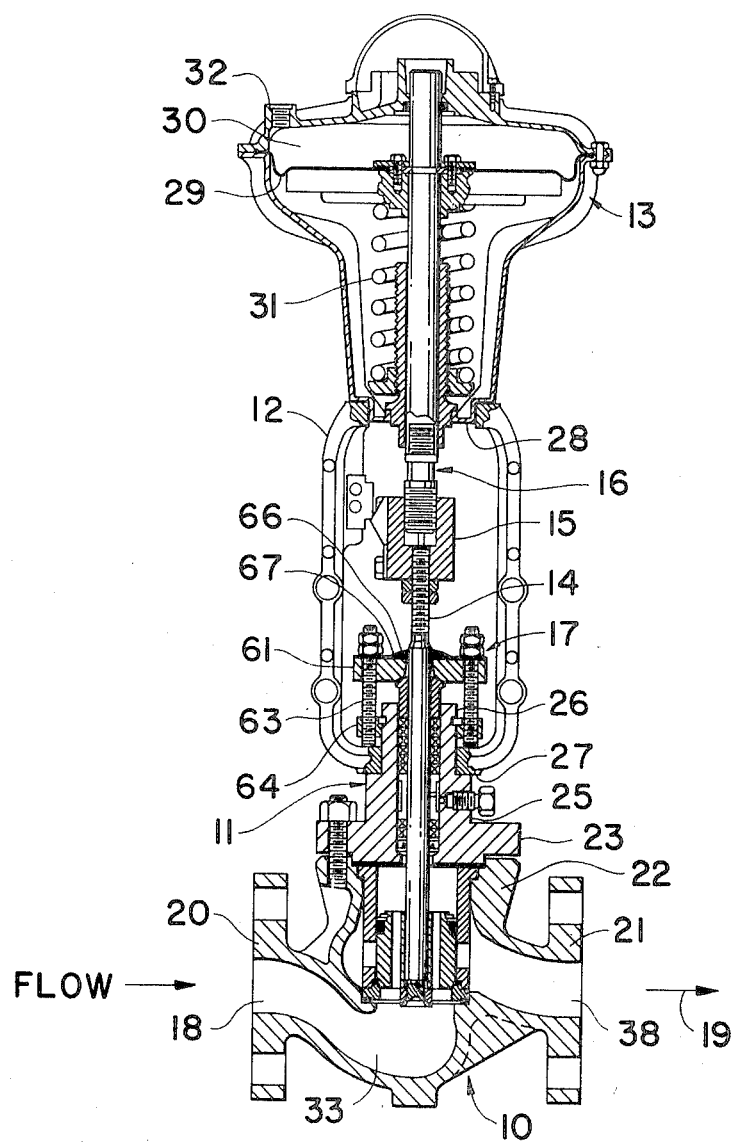
FIG. 2 and 2a are vertical central sections, of a cage-guided valve assembly according to this invention.
Figure 2A:
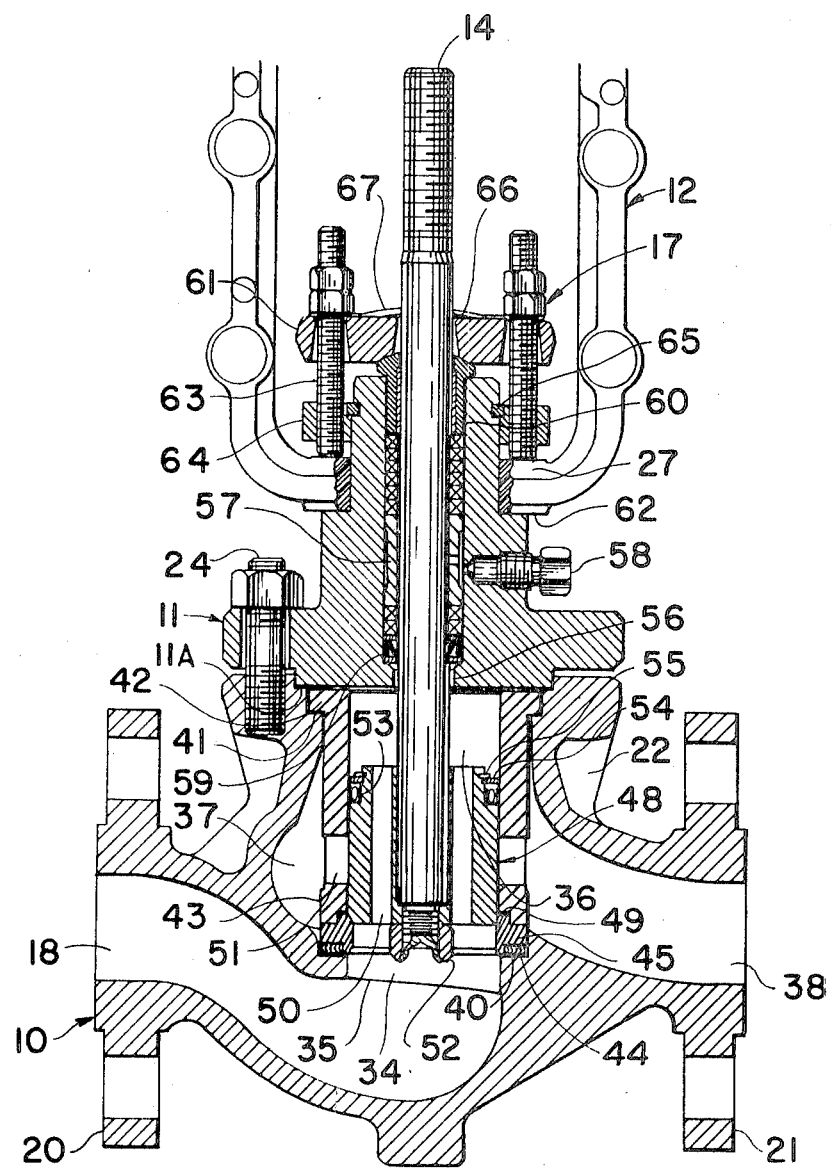

In FIGS. 2, and 2a the inner structure of FIG. 1 is shown. The valve body 10 has flow-through facility comprising an input passage 33, a valve aperture 34 in a bridge 35, a plug balance chamber 36, an output chamber 37, and an output passage 38. The top of the valve body is provided with an access opening 39 which receives the bottom of the bonnet 11 and the valve stem 14.

As will be set forth, highly precise means is provided for varying flow through the valve aperture 34. In support of this precision, superior valve performance is abetted through the use of special forms and volumes of the passages and chambers in the valve body 10. It is desirable that minimal turbulence or cavitation occur, and the input and output passages 33 and 38, as well as the immediate exit chamber 37 are streamlined to the maximum possible within the dimensional and form limitations imposed by practical body shape and dimensions. In support of precise valving, it is desirable to provide sufficient volume for fluid at both the entrance and exit of the valve aperture area. Thus, from the entrance to input passage 33, which in form and volume necessarily matches the pipe line and to which it is attached, the input passage 33 is increased in volume, continuously, and to the greatest extent possible while maintaining streamlining, up to the valving aperture 34. Similarly, but oppositely, the output passage 38 decreases continuously in volume from the exit chamber 37 to the outlet point from the valve body. Again in further support of the excellence of valving flow passage area change, the exit chamber 37 is formed not only with streamlining but is especially provided with sufficient fullness and depth to provide an area in depth for an exit buffer volume of fluid to avoid wall wearing jet impingement on the inner wall of the valve body, and to minimize turbulence and cavitation, especially that which might affect the valving area. The inner chamber 36 is sufficient in volume to allow effective valve plug movement and to provide a balance pressure chamber, but is preferably kept within the confines of the valve body and dead ended along the valve stem by the bottom of the bonnet and packing seals around the valve stem. The valve body 10 is provided with internal size increments of concentric assembly step formations. These are in aid of ease and simplicity of trim change, and assembly and disassembly of the valve for manufacture, service, and repair. The smallest is a valve seat annular recess 40, which is on the top of the bridge 35, around and on the downstream side of the valve aperture 34. The next largest is a recess step 41 for receiving a top flange 42 on a cage 43. The largest is a recess step 11A for receiving the lower end of the bonnet 11. This provides a simple nested assembly of the bonnet 11, the cage 43, and a seat ring 45, within the valve body 10.

This bonnet-cage-seat ring assembly comprises first a spiral metal ring gasket 44 laid in the seat ring recess 40. The seat ring 45 is laid on the gasket 44 and in the seat ring recess 40. The gasket 44 prevents pressure cementing of the seat ring into the recess, and the seat ring lies freely but with minimum slop, in the recess without threading or other securing means. Thus, the seat ring is held in assembly only by the cage 43 and thus is readily removable. The seat ring 45 has a special cross section form in aid of several functions. See FIG. 7. There is a bottom, outer step form 46 which receives the gasket 44 and allows the desirable situation of only partial crushing of the gasket 44 since the lower end of the seat ring then engages the base of the step 40. There is, also a top, outer step form 47 which receives the bottom of the cage 43 in solid engagement to hold the seat ring in place. The inner bottom edge of the seat ring is beveled to facilitate continuance of the flow passage in the juncture of the seat ring opening and the valve aperture 34. The inner top edge of the seat ring is also beveled, to receive the valve plug 48. A feature of the cage-seating ring assembly is an inner wall downward step form on the lower end of the cage 48 which has a riser dimension sufficient to receive a soft seat ring 49 when one is desired, with the soft seat ring tightly held when the bottom of the cage is firmly engaged with the seat ring. Thus the trim changes necessary to provide a soft seat valve for fluids requiring this extra valve seat seal effect is very simple and is easily accomplished by removing the cage and inserting the soft seat ring 49. The soft seat ring 49 is easily removable, since it is only sufficiently compressed in assembly to assure a secure assembly.

The valve structure of FIGS. 2 and 2a is a cage-guided plug type of balanced valve. The balance effect is provided for situations of high fluid pressure which, when acting in one direction only against the valve plug 48, will require undesirably large forces in the valve actuator to move the valve stem and plug. The balanced structure is accomplished by fluid passages 50 through the valve plug 48, to connect the input passage 33 with the valve body inner chamber 36. Thus, high pressures are oppositely applied to the valve plug 48 and the valve actuator needs only to overcome the differential of these high pressures.

This is a cage-guided structure in that the cage 43 is a sleeve, with the plug 48 in cylindrical form riding in the sleeve as a piston. The flow through the valve aperture is controlled by movement of the valve stem 14 to move the plug 48 with respect to the seat ring 45 to variably open side wall openings 51 in the cage 43. The critical form in this aperture is in the shape and contour of these side wall openings 51. These wall openings are formed according to computer aided design. The cage 43 is nested in the valve body by location of the top cage flange 42 in the body annular recess 41. The bottom of the bonnet 11 is nested in the body 10 in the recess 11A and in assembly engagement with the top of the cage 43 which in turn holds the seat ring 45 in place. Thus the seat ring assembly is a simple easy fit nesting combination of seat ring, cage, and bonnet end, all held together by bolts 24 which secure the bonnet 11 to the body 10.

The valve plug 48 has a central passage therethrough for closely receiving the lower end of the valve stem 14 which extends through the plug, and is provided with a holding end nut 52 threaded thereon to secure the stem 14 to the plug 48 by drawing a downwardly facing shoulder of the stem against an upwardly facing shoulder in the central passage of the valve plug. This assembly is permanently locked together by turning the lower end of the valve stem over the nut 52.

The valve plug 48 is provided with a special seal combination with respect to the inner sleeve wall of the cage 43. In aid of this seal assembly, the upper end of the plug 48 is peripherally formed in upwardly decreasing step forms. On the lower step, there is a seal combination 53 of a deformable U ring with a deformable seal ring with the U. On the upper step, a retaining ring 54 is easily assembled by sliding on over the top of the plug. A snap ring 55 is mounted in a peripheral slot above the retaining ring.

Accordingly, the whole structure of seat ring, cage, and valve plug-and-stem is easily and simply assembled and disassembled.

The bonnet valve stem passage 56 has a main diameter sufficient to receive the valve stem with packing about the stem to seal off fluids from inside the valve body 10. The lower end of the passage 56 is reduced in diameter to provide a shoulder in support of a column of packing around the valve stem, up along the passage 56. This packing column is provided with a lantern ring spool 57 for lubrication from the side through a connector 58.

The lower end of the packing ring column is provided with a valve stem scraper ring 59, between two washers. The upper end of the packing ring column is pressed down by a packing gland 60 with a stem guide bushing therein.

The top structure of the bonnet 11 is a joint assembly to the bonnet of the yoke 12 and a gland flange 61. A peripheral step 62 is provided around the bonnet, and the base ring 27 of the yoke 11 is rested on the step 62. The riser wall of the step 62 is formed at the same diameter for various valve sizes to diminish the number of parts necessary for full product line of valves.

The yoke base ring 27 is held on the step 62 by bolts 63 threaded through a yoke lock ring 64 slipped over the top end of the bonnet and secured by a split ring 65 keyed into a peripheral slot around the top portion of the bonnet. Thus, the bolts 63 while also holding down the gland flange 61, hold the yoke independently.

The packing gland flange 62 has holes therethrough which loosely receive the bolts 63 which are secured by nuts to hold the gland flange against the packing gland 60. Around the valve stem 14, on top of the gland flange 61, a felt wiper 66 is mounted, and is held in place by an outwardly convex holed disc wiper clamp 67, thus avoiding a dirt pocket about the valve stem 14 where the stem extends beyond the bonnet.

FIG. 3 in exploded view, shows the details of the structure of FIG. 2 with like reference numbers on like elements, and also shows an alternative packing assembly, using a coil spring for applications requiring the extra packing takeup provided by the spring, and shown without the lantern-ring lubrication device of FIG. 2.

At the left of FIG. 3, the valve body 10 is shown, with the floe entrance at 18 and the flow exit indicated at 19. The body pipe line mounting flanges are indicated at 20 and 21, strengthening rib at 22, and the top access opening 39 is shown, for receiving the various inner body parts. Above the valve body 10 the seat ring grouping is shown, with the seat ring gasket 44, followed by the seat ring 45 itself, with the optional soft seat ring 49 shown above it. Above this grouping, the permanent assembly of the valve plug 48 and the valve stem 14, is presented. In this type of valve, the plug 48 is cylindrical in form, operable as a piston by up and down movements of the valve stem 14.

At the right of the valve body showing, in FIG. 3, is the main grouping of the cage 43 and the bonnet 11, with major associated parts. The cage 43 is the cylindrical sleeve with its top peripheral flange 42 and a top seal ring 43A. In the lower portion of the cage 43, side wall fluid flow parts 51 are provided preferably four ports, evenly spaced around the cage periphery. Two of these ports, oppositely placed, are formed generally as inverted triangles, but with curved sides. The other two ports are essentially oval, in horizontal disposition, somewhat as a truncation of the triangle form of the first ports. The configuration of these ports is the result of computer aided design. In the operation of this type of valve, the valve plug 48 is sealed, top and bottom within the cage 43. When the plug is lifted off the seat ring, there is no significant flow through the valve until the lower, apex point, portion of the triangle cage ports 51 is uncovered. Thereafter, as the plug is further lifted, the flow increase increment is increased, according to the triangle port form, and substantially more so as the valve approaches full open and the horizontal oval cage ports are uncovered. Further, in FIG. 3, the bonnet 11 is shown in its outer peripheral stepped form, with the broad, mounting base flange 23, the central diameter step riser portion 25, the step 62 on which the lower yoke ring (not shown) is to be rested, the lesser diameter riser portion 26 over which the lower yoke ring and the yoke lock ring 64 are to be mounted. Near the top of the bonnet, a peripheral key channel is shown, for receiving the split-ring 65 as an anchor for both the yoke lock ring and the lower yoke ring. In furtherance of the FIG. 3 central, bonnet showing, the top elements, the gland flange 61, the felt wiper 66, and the felt wiper clamp 67, are presented.

Finally, in FIG. 3, at the right of the drawing, alternative valve stem packing column elements are shown. The left of these two illustrates the packing column elements of FIG. 2 with the bottom scraper ring 59 with top and bottom washers, two sets of packing rings separated by the lantern ring 57 as a lubrication device, and topped off by the packing gland 60 with a bushing for receiving the valve stem within the packing gland. The alternative packing column, on the right, options to omit the lantern ring although it may be used if desired; and provides a coil spring for additional takeup facility on the packing column for use in applications where such additional sealing of the valve stem is deemed to be necessary.

Figure 4:
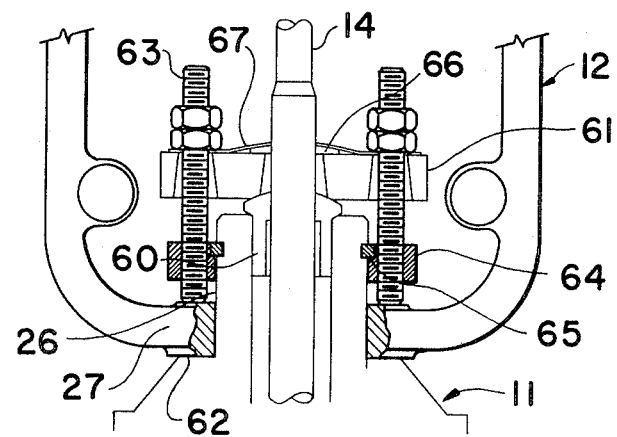
FIG. 4 is a detail of the yoke and bonnet top assembly of the structure of FIGS. 1–3.

In the FIG. 4 enlargement of the top assembly on the bonnet 11 of FIG. 2, the particular combination of the yoke 12 and the gland flange 61 is presented.

A feature of particular importance is the size of the outside diameter 26 of the top of the bonnet 11. This, in combination with the bonnet peripheral step 62 is provided in the same fashion and dimension in each of several sizes of valves so that the same yoke size may be used with each of these several sizes. Such a reduction in shelf items of the product line is a significant feature in the provision of a simplified product line of valves, in accordance with this invention.

As in this showing, the lower ring 27 of the yoke 12 mounts on the top 26 of the bonnet 11, in sliding fit therewith, and resting on the bonnet step 62. The yoke 12 is held down against the bonnet step 62 by studs 63. The studs are threaded through the yoke lock ring 64 which is anchored by the split ring 65 which is keyed into the bonnet in the peripheral slot provided therefor. Accordingly, the yoke is independently mounted yet easily removable. At the same time, the same studs 63 that are used to hold the yoke, are also used to hold the gland flange 61 down against the packing gland 60, with suitable nuts on the studs and against the top of the gland flange. Thus the gland flange mounting is also anchored by the split ring 65 through the lock ring 64.

The packing gland is provided with a convex flanged top portion so that it nests into the valve stem opening in the bonnet with its flange resting on the top of the bonnet. The gland flange 61 has a central opening therethrough for receiving the valve stem 14, with substantial clearance. This opening is outwardly tapered in a downward direction, and its bottom outlet is beveled to essentially match the convexity of the top of the packing gland 60. Further, outer openings through the gland flange 61 are provided, for receiving the studs 63, with, again, significant clearance, with this clearance increasing outwardly and downwardly. Accordingly, in a simple, self-adjusting mounting, the gland flange 61 may be rocked somewhat on the packing gland. The gland flange is thus also independently mounted and is easily removable without removing the yoke. The yoke may therefore be readily used as a part of the main valve assembly of body and bonnet. Shipping and handling is facilitated by the yoke as a protector of the stem and bonnet, and as a handle to simplify lifting and handling of the valve in the factory, in shipment, at distributing points, and at the site of use.

It may be noted that the same size yoke lock ring, and gland flange, as well as the same size yoke, may be used in any of several sizes of valves.

Figure 5:
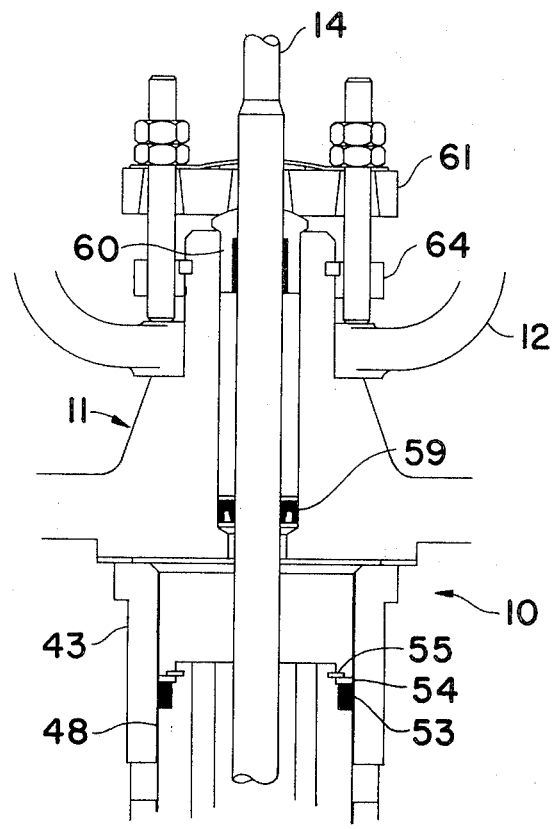
FIG. 5 is a detail of valve stem guidance of FIGS. 1–3.

In FIG. 5, the operational guidance of the valve plug and stem combination of the cage guided valve type is presented. In the bonnet 11, the upper portion of the valve stem 14 is guided by the bushing within the packing gland 60. At the lower end of the bonnet, the stem 14 is provided with a degree of guidance by the scraper ring 59. Within the valve body 10, the plug 48 is guided as a piston, by the inner, cylindrical wall of the cage 43.

Figure 6:
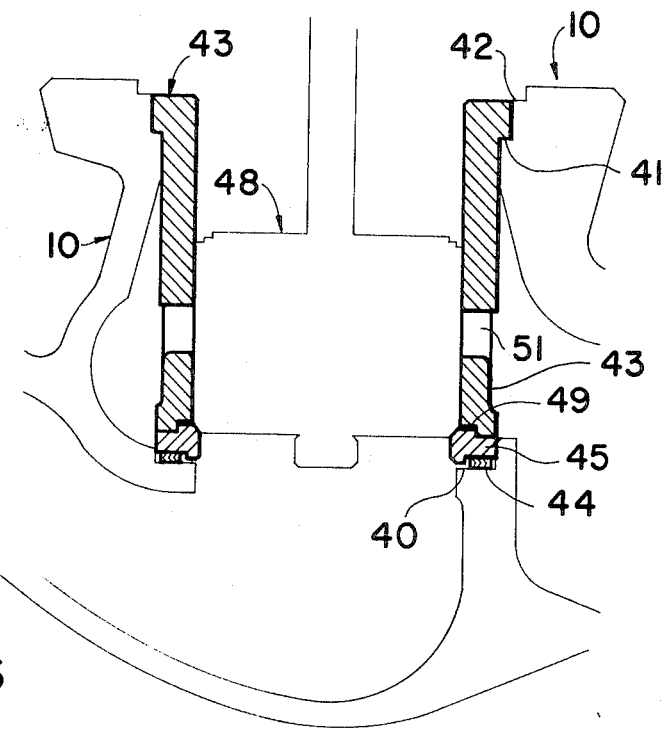
FIG. 6 is a detail of the cage and seat ring combination of FIGS. 1–3.

The FIG. 6 illustration points up the feature of this invention in the nature of the simple, drop-in assembly combination of the seat ring gasket 44, the seat ring 45 resting on the gasket, and the cylindrical sleeve form of the cage 43 resting on the seat ring. In support of this assembly feature, the stepped formations of the valve body are apparent in FIG. 6. The seat ring step 40, in combination with the larger cage step 41, and the still larger, bonnet end receiving step 42, provide the support basis of this useful, nested assembly. This situation is enhanced by the step form in the lower end of the cage 43, which optionally receives the soft seat ring 49 in a simple, nesting arrangement providing means for quick and easy change to or from a soft seat valve structure.

Figure 7:
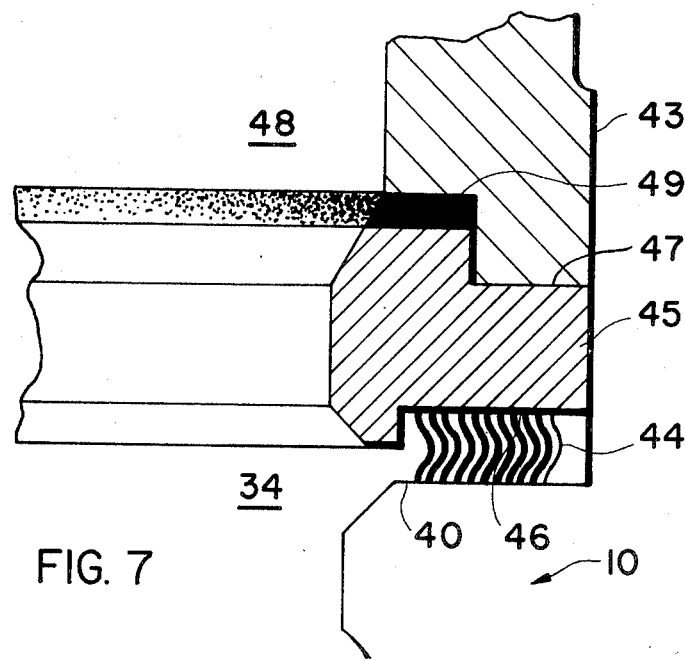
FIG. 7 is an enlargement of the seating portion of FIG. 6.

In FIG. 7, the enlarged showing 13 a fragment of the form and assembly of the seat ring 45. The metal strip gasket 44, formed as a spiral, with its strip edges oppositely on the body step 40 and on the seat ring step 46, is partially crushed in assembly, and protected by engagement of the lower end of the seat ring with the body step 40. The plug and valve body passage matching bevels on the inner periphery of the seat ring are demonstrated, as well as the soft seat ring 49 as partially compressed in assembly but protected by the engagement of the lower end of the cage 43 with the seat ring.

FIG. 8 shows the valve actuator shaft 16 in end to end connection with the valve stem 14 in a connector block 15. An adapter 68 is threaded into the end of the actuator shaft and into one side of the block 15. The top of the valve stem is threaded into the other side of the block. The device is constructed as a split block held by bolts 69 and secured by jam nuts 70. FIG. 9 is an exploded view of the FIG. 8 structure.

FIGS. 10, 10a, 11, and 12 illustrate the stem-guided plug type of valve embodying this invention. The outer form is essentially that of FIG. 1. This structure is the same as that of FIG. 2 except for the plug and cage assembly. The cage 71 is a support device for the seat ring 45. The cage 71 is provided with side wall openings 72 of sufficient size to pass full fluid flow. The controlled variable aperture in this case is between the valve plug 73 and the seat ring 45. The lower portion of the plug is contoured according to computer aided design. The valve stem 14 is threaded into the top of the plug 73 and permanently secured against a shoulder in the plug by turning of a portion of the top of the plug into a peripheral recess in the valve stem 14. A feature of this structure is a central boss 74 in the cage 71 with a bearing bushing therein to provide a stem guide within the cage area.

The FIG. 11 exploded view particularly shows the valve plug and cage form of this type of valve. In this valve type, the controlling variable orifice is between the valve plug and the seat ring. The cage wall openings 72 are all the same and are used as passages capable of accepting full flow. Support for the central boss 74 in the cage 71 may be seen in FIG. 11 in the formation of the top of the cage.

FIG. 12 is an enlargement of the stem guide structure of this plug type of valve, especially with respect to the cage boss 74 as a stem guide within the cage, as related to the bonnet 11 and the structure and stem guide assemblage of and with the bonnet. Thus the top stem guide function includes the bushing in the gland 60. The FIG. 13 external view of a needle-trim valve according to this invention is somewhat different in appearance from similar views of the other valve structures as exemplified in FIG. 1, but the elements are sufficiently the same as to be identifiable by the same element numbers as in FIG. 1.

Figure 14:
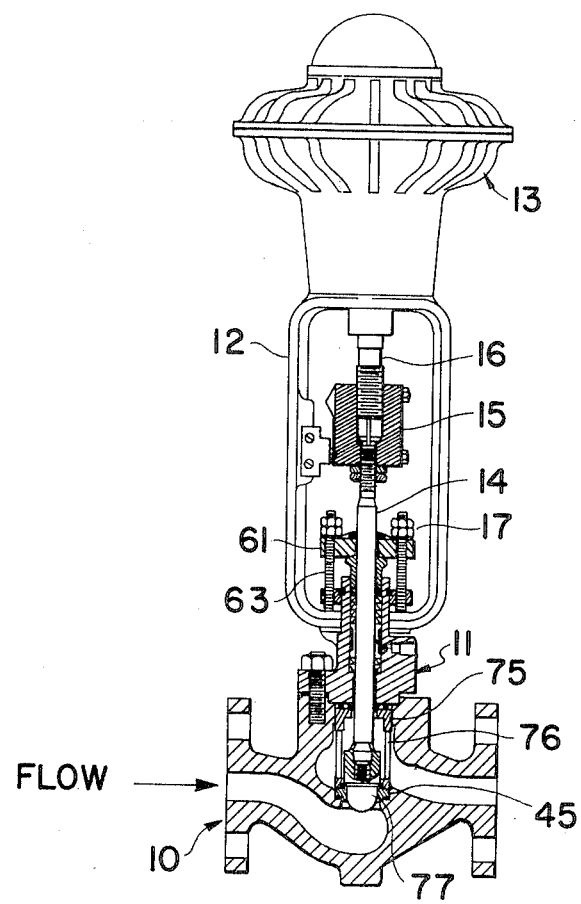
FIGS. 14 and 14a are vertical central sections of a needle-trim stem-guided plug type of valve assembly of FIG. 13.
Figure 14A:
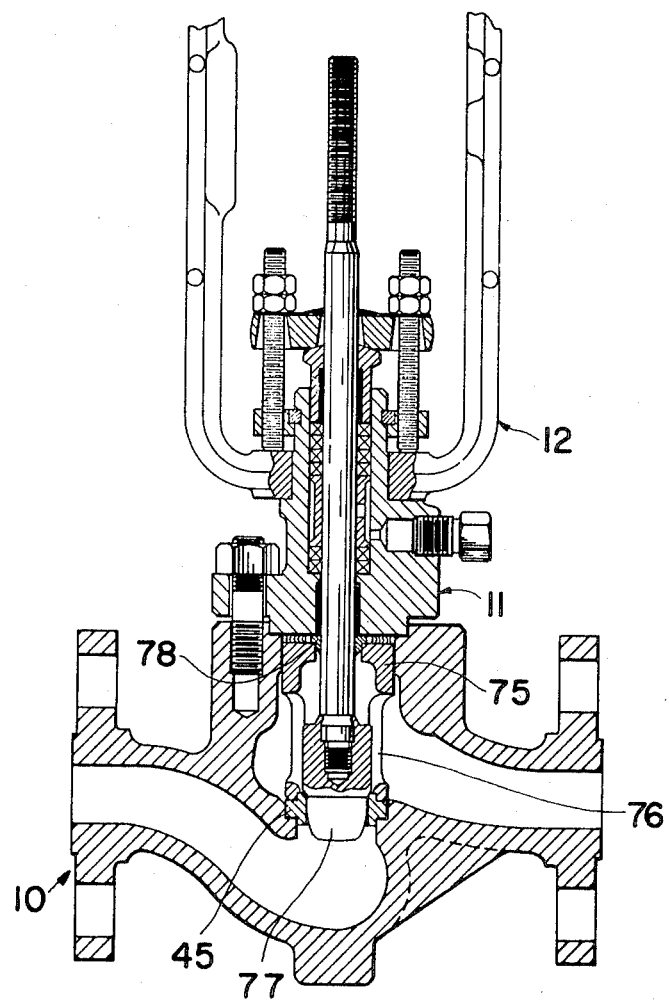

The structure shown in FIG. 14 is the same as that in FIGS. 2 and 10, except for the cage and plug assembly. The FIG. 14 cage 75 is a holding device for the seat ring 45. The cage 75 is provided with side wall openings 76 of sufficient size to pass full fluid flow. The controlled variable aperture in this cage is between the special needle-trim plug 77 and the seat ring 45. The lower portion of the plug is contoured according to computer aided design. The valve stem 14 is threaded into the top of the plug 77 and permanently secured against a shoulder in the plug by turning of a portion of the top of the plug into a peripheral recess in the valve stem 14. The top of cage 75 is provided with an inwardly extending cap area which supports a scraper ring 78 about the valve stem 14 with the ring 78 also acting as a stem guide aid, within the valve body.

Figure 15:
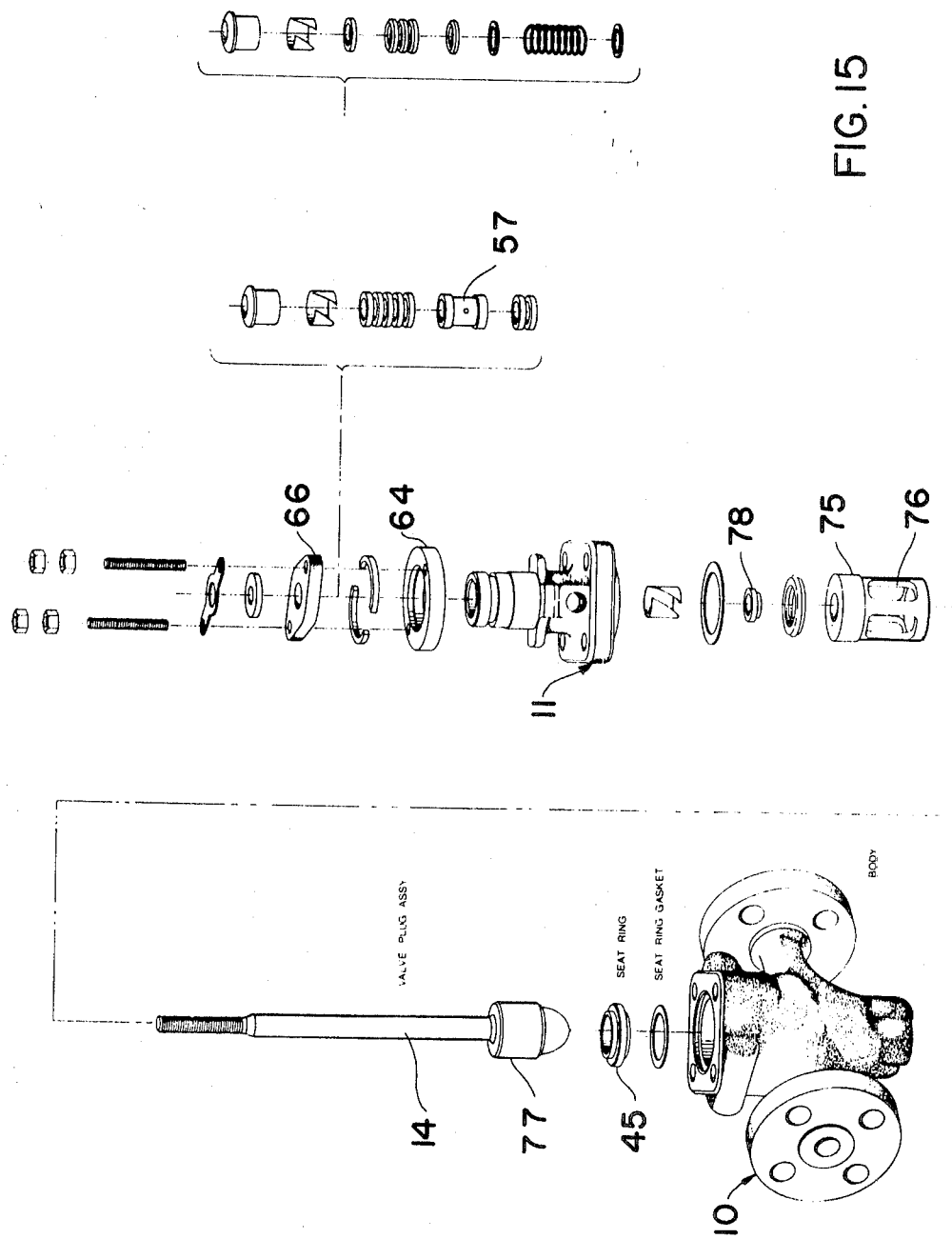
FIG. 15 is an exploded view of the structure of FIG. 14, as if FIG. 14 were whole, with a showing of alternative sets of valve stem packing.

The FIG. 15 exploded view particularly shows the valve plug and cage form of this needle-trim type of valve, and presents a top view of the cage top cap area in support of stem guiding function.

Figure 16:
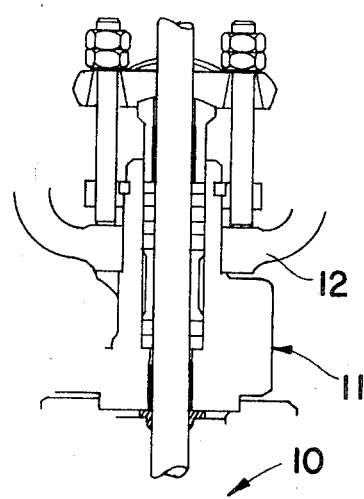
FIG. 16 is a detail of the valve stem guidance of FIGS. 14 and 15.

FIG. 16 is an enlargement of the stem guide structure of this type of valve, further illustrating the cage stem guide area.

A feature of this invention is the CAD (Computer Aided Design) of the valve aperture flow passage control areas as varied by moving the valve plug in its operative stroke. This is accomplished by the actuator, through the valve stem.

It is highly important to have precisely operable and predictable $C_v$ percentage curve performance in a valve. That is, at each incremental point of valve stem movement, maximal control requires maximal response in terms of flow output, with respect to the theoretically expected flow output. Precise valve opening area must be known, in terms of each increment of valve stem movement and with respect to factors such as the coefficient of discharge of the particular valve. This coefficient, sometimes referred to as E, is herein referred to as SF, for Spink Factor. It is so identified because of the contributions to this art by Leland K. Spink, now deceased, as expressed in his well-known Flow Handbook, and because the associative considerations with respect to the nature of the coefficient of discharge of a valve as specific to the actualities of fluid flow in a particular valve for a particular application.

$C_v$ is an expression of valve capacity defined as the number of U.S. gallons per minute of water discharged through a wide-open valve with a 1 p.s.i. pressure drop across it. Thus, a $C_v$ percentage curve represents such capacity in terms of increments of valve opening areas produced by increments of valve stem movement.

In this invention, the significant valve area of flow control is established, on a changing basis with valve stem movement, as between the valve plug and a fixed, aperture portion of the valve assemblage. In the case of the cage valve of FIG. 2, this fixed portion is the valve cage side wall openings, FIGS. 17–17c. In the case of the plug valve of FIG. 10 and the needle trim valve of FIG. 14, this fixed portion is the valve seat ring opening, FIGS. 18–18c.

Such valve opening changes preferably start from full closed position, at first with small increments of area change, and end with large increments of area change, up to full open position. Such changes require highly accurate and precisely formed curved surfaces in the valve. In the cage valve this is the curve of the cage wall opening, FIGS. 17–17c, and in the plug and needle trim valves, this is the curve of the operating face of the valve plug.

The construction of such valve plug curved faces, and valve cage curved flow openings, is accomplished according to this invention through computer aided design. Highly precise formations, leading to significantly improved valve performance are accomplished by such computer aided design, translated into structural coordinates for machine tool or casting formation on the basis of construction increments, such as cutter steps, of the order of one ten-thousandth of an inch.

This design is accomplished by first establishing a theoretically precise $C_v$ percentage curve in which SF is an empirically established value in the light of the general size and form parameters of the valve and in terms of the actualities of performance of the valve peculiar to the particular nature and application of the valve. That is, with SF as an adjustment factor as between the actual and the theoretical, in performance.

Such a $C_v$ percentage curve is fed into a computer along with a program of increments of valve stem movement. Then, according to the formula $A=C_v/38SF$, the computer is used to determine the area changes with valve stem increments by reference to the theoretical $C_v$ percentage curve. From the findings of these area changes, further computer action provides X—Y coordinates for the actual construction of the valve surface contour, whether on the plug or in the cage wall openings. This formula derives from the base flow formula for fluids, as will be set forth hereinafter. Where actual tests from the so constructed valves dictate, an adjustment of the SF factor can be made and the computer steps repeated. This iteration is continued until the actuality of performance is suitably comparable to the original empirical $C_v$ curve performance representation. Where useful, the above X—Y coordinates may be used to construct a template from which actual plug or cage opening contours may be formed. Thus a description and definition of significant valve contours according to this invention, require inclusion of such formula and computer considerations to sufficiently define the structure.

The flow formula derivation as an achievement of a working formula for application to a computer is the course of producing valve configurations according to this invention, is presented as follows: (this is for liquids, as an example)

(1)    $Q = SFA \sqrt{2gh}$

This is basic equation for liquid flow. Reference: Mechanical Engineers Handbook, Pages 3–62, 6th edition, Mark's—Baumeister.

Units for these equations are: $Q$ = Cu. ft. per second discharge $g$ = Acceleration gravity in ft./sec.$^2$ (32.2)

$A$ = Orifice area in sq. feet $SF$ = Coefficient of discharge $h$ = Differential head in feet $V$ = Flow rate, U.S. gal./min.

$G$ = Specific gravity (water = 1.0)

$d$ = Orifice dia. inches (valve size) (or equivalent for different shape)

$w$ = Fluid density, lb. per cubic foot $\Delta p$ = Differential head (pressure drop), p.s.i.

$C_v$ = An expression of valve capacity defined as the number of U.S. gallons per minute of water discharge through a wide-open valve with 1 p.s.i. pressure drop across it.

Conversion equivalents:

$A = \pi d^2/(4 \times 144) = 0.00545 d^2$ (use other than $d$ combinations for other than circular forms)

$w = 62.4G$ $h = 144\Delta p/w = 144\Delta p/62.4G = 2.31\Delta p/G$ $Q = V/(7.48 \times 60) = V/449$ (1)    $Q = SFA \sqrt{2gh}$ (1A)    $Q = 8.03 \, SFA \sqrt{h}$ Substituting in (1A)

(2)    $\dfrac{V}{449} = 8.03 A (0.00545 d^2) \sqrt{\dfrac{2.31 \Delta p}{G}}$ (3)    $V = 29.87 SF d^2 \sqrt{\dfrac{\Delta p}{G}}$ By definition $V = C_v$ when $\Delta p = 1.0$ and $G = 1.0$ (4)    $C_v = 29.87 \, SF \, d^2$ Substituting (4) in equation (3)

(5) $$V = C_v \sqrt{\frac{\Delta p}{G}}$$

thus
(5a) $\sqrt{\Delta p} = V/C_v$
Now (1A) $Q = 8.02\, SFA \sqrt{h}$
since $h = 2.307$ ft. per p.s.i. × $\Delta p$
(6) $Q = 8.03\, SFA \sqrt{2.307 \Delta p}$
(7) $Q = 12.18\, SFA \sqrt{\Delta p}$
(8) $\sqrt{\Delta p} = Q/(12.18\, SFA)$
Thus (5a) = (8)
(9) $Q/(12.18\, SFA) = V/C_v$
Apply conversion equivalents: $Q = V \times 2.228 \times 10^{-3}$
because
$V$ = gal. per min.
$Q$ = ft. per sec.
(10) $V \times 2.228 \times 10^{-3}/(12.18\, SFA) = V/C_v$
(11) $(2.228 \times 10^{-3})/(12.18\, SFA) = 1/C_v$
(12) $C_v = 5.4681 \times 10^{-3}\, SFA$
With correction term for feet and inches
(13) $$C_v = \frac{5.4681 \times 10^{-3}}{144} SFA$$
(14) $A = C_v/(38\, SF)$ Thus (14) $A = C_v/(38\, SF)$ is the area formula applied to the computer to determine areas with valve stem increment. These area values are developed by computer into X—Y coordinates for valve contour structure formation.

Figure 17:
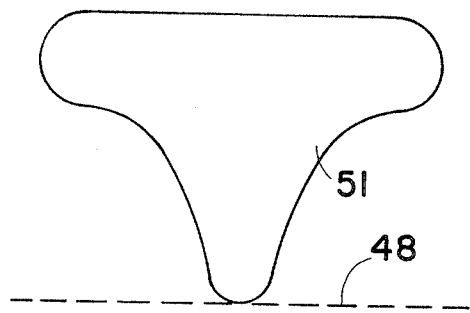
Figure 17A:
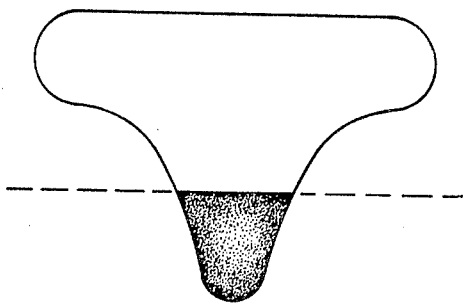
Figure 17B:
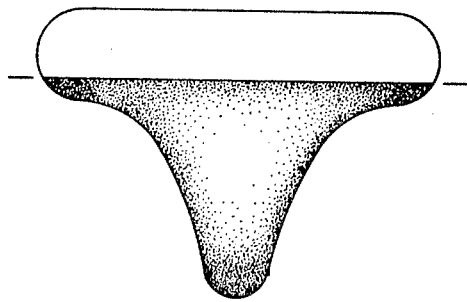
Figure 17C:
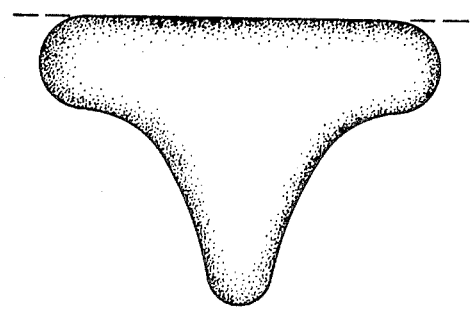

FIGS. 17–17c illustrate a sequence of valve positions from full closed, FIG. 17, to full open, FIG. 17c. This is the significant valving opening form in the wall of the cage in the FIG. 2 cage-guided valve. As one form of such openings, two triangle-like forms and two horizontal ovals are combined in one cage. See FIG. 3. This means only that at the point indicated in FIG. 17b, horizontal oval openings are cut into the flow in addition to the difference between FIGS. 17b and 17c. This is a means of accelerating the final stage of valve opening to full open situation.

The curved forms of FIGS. 17–17c are the result of computer aided design, including the oval openings, when used.

FIGS. 18–18c are comparable to FIGS. 17–17c except that they represent the plug form and action of plug type and needle trim valves, from full closed at FIG. 18 to full open at 18c. The curve of the plug 73 as shown is produced through computer aided design.

The particular area of these valve openings, that is, the plane of cross section used as the basis of computer aided design, is a matter of essentially arbitrary selection within the general operating aperture area. For example, in FIGS. 18–18c a horizontal plane including the angle point at the bottom of the seat ring top internal bevel, may be so used.

The structural formations of the valve plugs of the stem guided valve and the needle-trim valves of this invention, as well as the cage wall openings of the cage-guided valve, as previously set forth, are the concrete results of computer-aided design, and are significantly described in terms of such design.

In support of the superior valve performance deriving from such computerized structure, the valve body passages and chambers are streamlined, fulsome and dimensioned to provide fluid flow capability leading to and away from the valve variable aperture area, which does not detract from the performance capability provided by the computerized valve structure.

Figure 19:
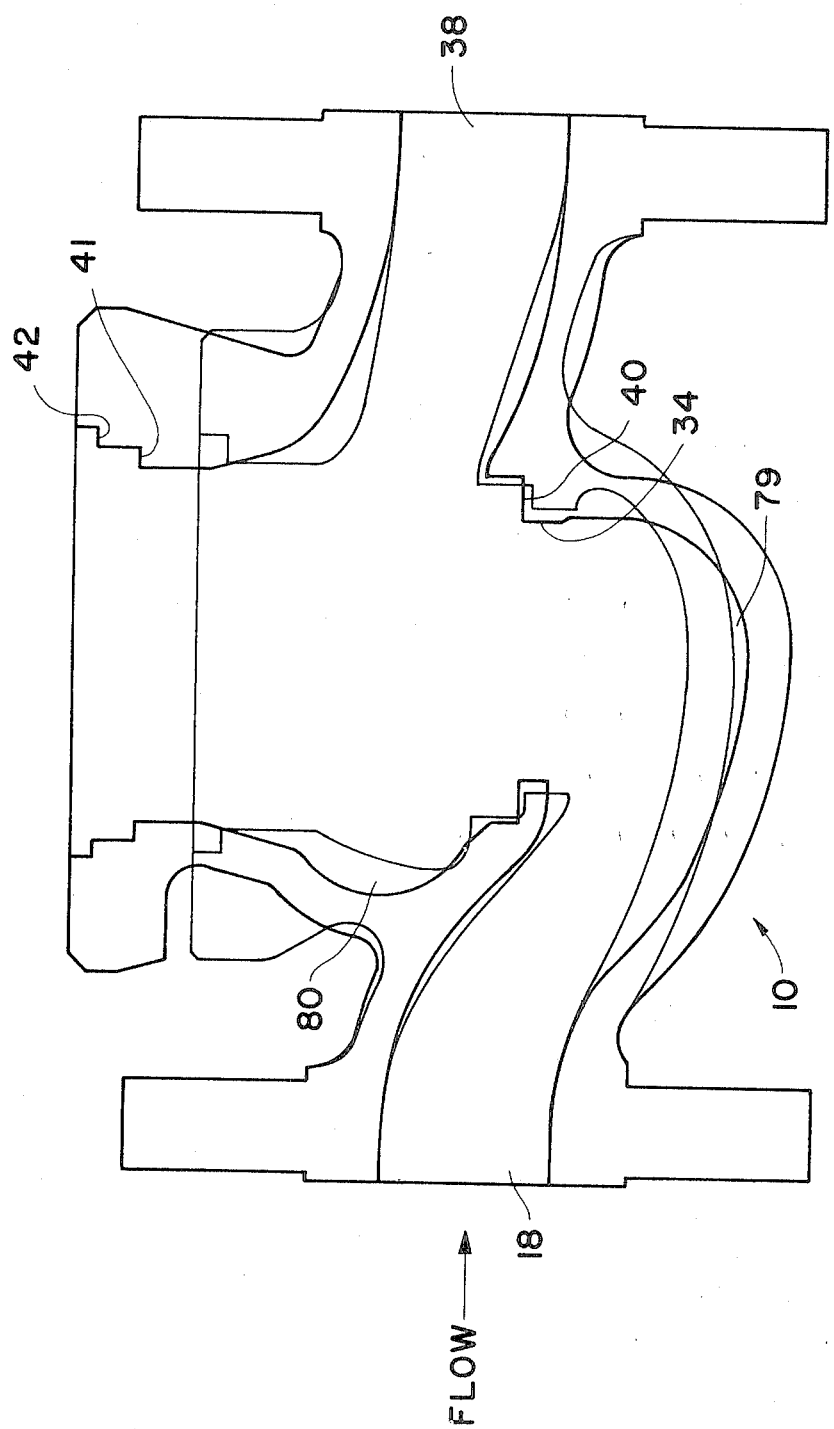
FIG. 19 is a schematic overlay comparison of valve body internal form with a typical previous form.
Figure 20:
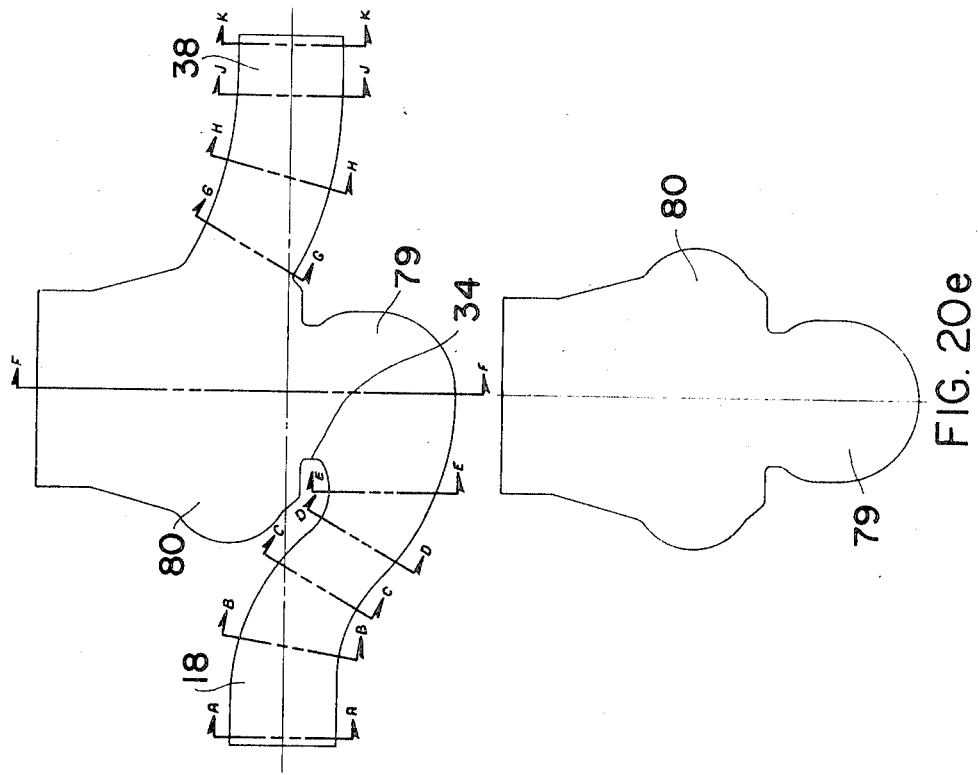

FIGS. 19–20h illustrate these internal body forms and dimensions.

A further, significant feature of such valve body forms and dimensions, is in the consideration of noise. Noise has long been a troublesome feature in valve usage and operation, but with modern increase in size and complexity of industrial and service situation, noise has become a significant pollutant. Noise may be audible or inaudible in terms of the effect of fluid passing through valves. Noise is also a factor of consideration in terms of disruption or introduction of error into flow measurement in valved flow systems. Noise, in this last context is in the sense of turbulence, cavitation, and pressure variants not representative of flow values. Thus sound, as noise, may also provide conditions of measurement signal noise.

The illustrations of FIGS. 19–20h are representative in form and dimensions, of typical valve structures according to this invention and according to valve product lines envisaged by this invention. The forms and dimensions illustrated are by way of example, and are of the order of the actualities.

FIG. 19 is an overlay schematic of a central vertical section through a valve body according to this invention, in heavy lines, overlying a valve body typical of previous valve bodies, in light lines. The depth and fullness of the input flow passage adjacent the valve aperture 34 is indicated at 79, and, similarly for the output flow chamber, at 80. The streamlining of the input and output flow passages 18 and 38 is shown as maximal.

FIG. 19 provides an illustration of the body step form which lends itself to the cage-seat ring-bonnet nesting assembly of this invention. These steps are, the seat ring step 40, the cage-flange step 41, and the bonnet base-seat step 42.

FIG. 20 is an outline form of the internal configuration of a valve typical of this invention. FIGS. 20a–20d are cross sections taken along the input passage 18, and, notably, increase in area. FIG. 20e illustrates the central form of the interior of the valve body in a vertical central section. FIGS. 20g–20h are cross sections taken along the output passage 38, and, notably, decrease in area.

Dimension relationships of note are in the context that they are in the order of the size considerations as set forth.

With reference to the entrance diameter of the entrance to input passage 18, the cross sections FIGS. 20d and 20f essentially equal this dimension in one direction and double it in the orthogonally aligned direction. The input chamber portion 79 is of a depth from the valve aperture 34 which equates to the diameter of the entrance to input passage 18. The output chamber portion 80 is of a depth essentially equal to one-half of the diameter of the entrance to input passage 18. The chamber 80 in cross section, is essential a circular curve from a center essentially in the sleeve body of a cage when used in such a valve form. Further as in FIG. 20e, the chamber 79 is essentially spherically globular, with its center on the vertical axis of the valve aperture 34.

Figure 21:
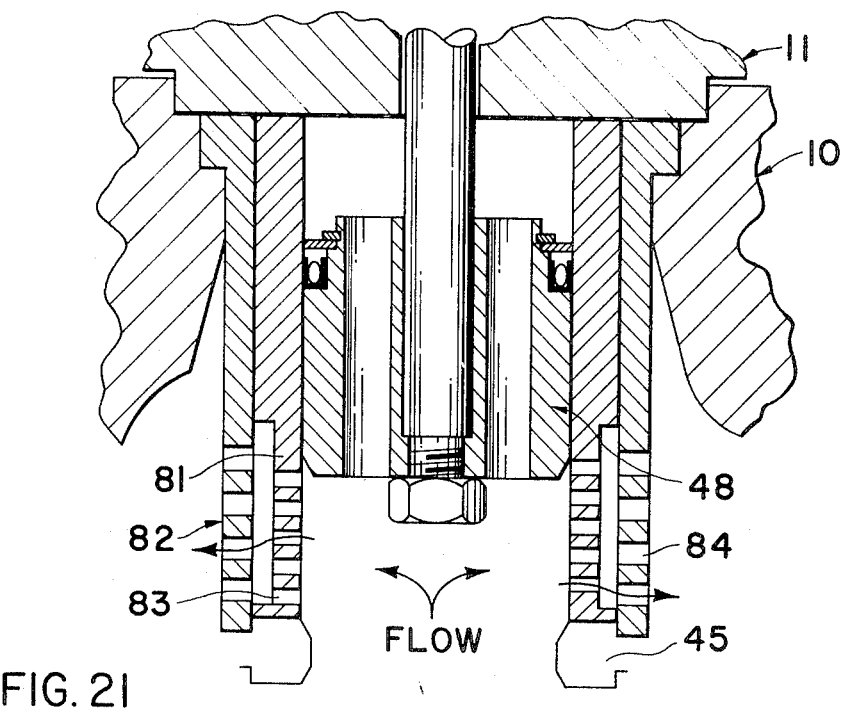
FIG. 21 is a sub-assembly showing of a double-cage noise reducing system.
Figure 22:
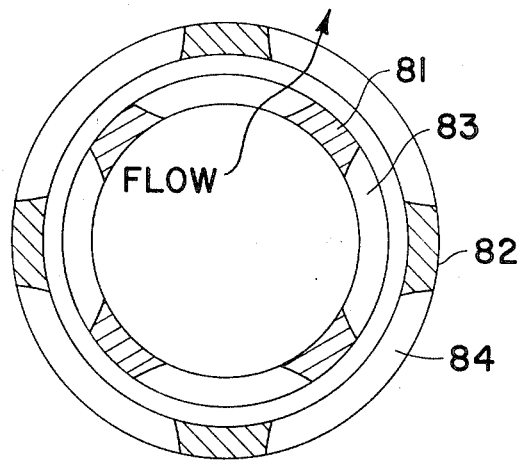
FIG. 22 is a transverse horizontal section of the double-cage structure of FIG. 21.
Figure 23:
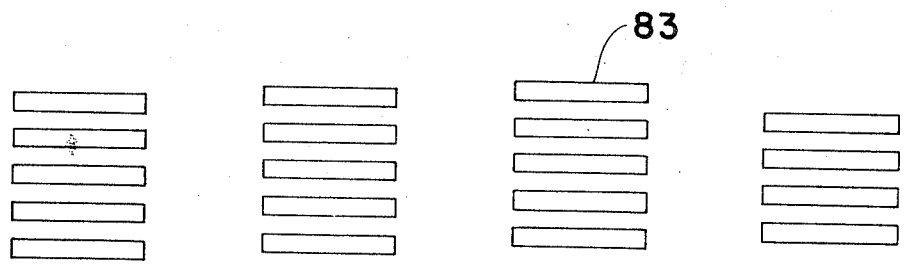
FIG. 23 is a schematic illustration of cage openings of FIGS. 21 and 22.

In FIGS. 21–23, the noise reducing double cage sub-assembly is for a reduced area cage type of valve trim for use in high pressure drop applications.

This is a cage within a cage, usually spaced, with wall openings therethrough, preferably with staggered formation to form tortuous paths for flow therethrough. The inner cage can be characterized in the areas of its wall passages by CAD in terms of $C_v$ versus plug lift. Ceramic coating or the like may be used for its wear resistance, on ports of this cage system where there is no friction, as from the valve plug. This system protects the the valve body from wear since most of such effects are absorbed by the cages. Because of the tortuous flow paths, all ports of the valve body and cage system are full of the flowing fluid and this is a noise minimizing factor. This cage system is interchangeable with standard cages in standard bodies, and a standard valve plug can be used. The cage wall openings may be gang-milled slots for inexpensive manufacture. For specific area applications, round or other shapes of holes may be used alone, or in combination with various slot formations. This design concept can be applied to all valve sizes with equal efficiency. The various wall holes may be offset with respect to each other. In one form, the holes may be spiralled or overlapped to provide continuous, analog increments of valve aperture area change with valve stem lift. This system breaks flow into small streams, and provides angular flow direction changes to dissipate energy and reduce noise. The valve plug is apertured as a balanced valve plug. This encourages flow swirling to assure full application to all cage holes.

In FIG. 21, this double-cage quiet trim is shown in a valve structure indicated as like that of FIG. 2, with valve body 10, bonnet 11, valve seat ring 45, and valve plug 48. In FIG. 21, there is provided an inner sleeve cage 81, and an outer sleeve cage 82 with wall-through passages 83 and 84 respectively. As indicated by arrows, the flow through these cages is diverted from straight through directions.

Both cages, together, drop into place in the previously described assembly manner of cage and seat ring assembly, as held by the bonnet 11.

The inner cage 81, in its upper portion, fits closely within the outer cage 82. The lower portion of the inner cage is provided with a cutaway form, to space the cage wall openings of the inner and outer sleeves from each other.

As the valve plug 48 is lifted, more of the cage wall openings are free to receive the flow through the valve. Analog increments of such increase are shown in the example of FIG. 23. The cross section of FIG. 22 illustrates one form of cage wall hole distribution, peripherally offsetting the outer cage holes with respect to the inner cage holes.

Figure 24:
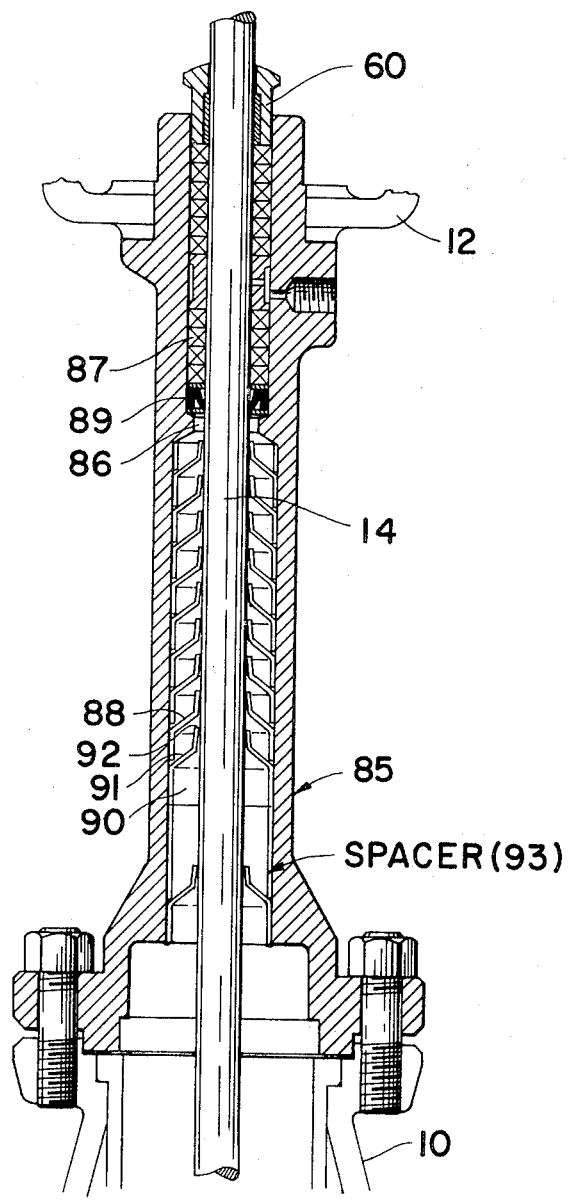
FIG. 24 illustrates a bonnet cooling system.
Figure 25:
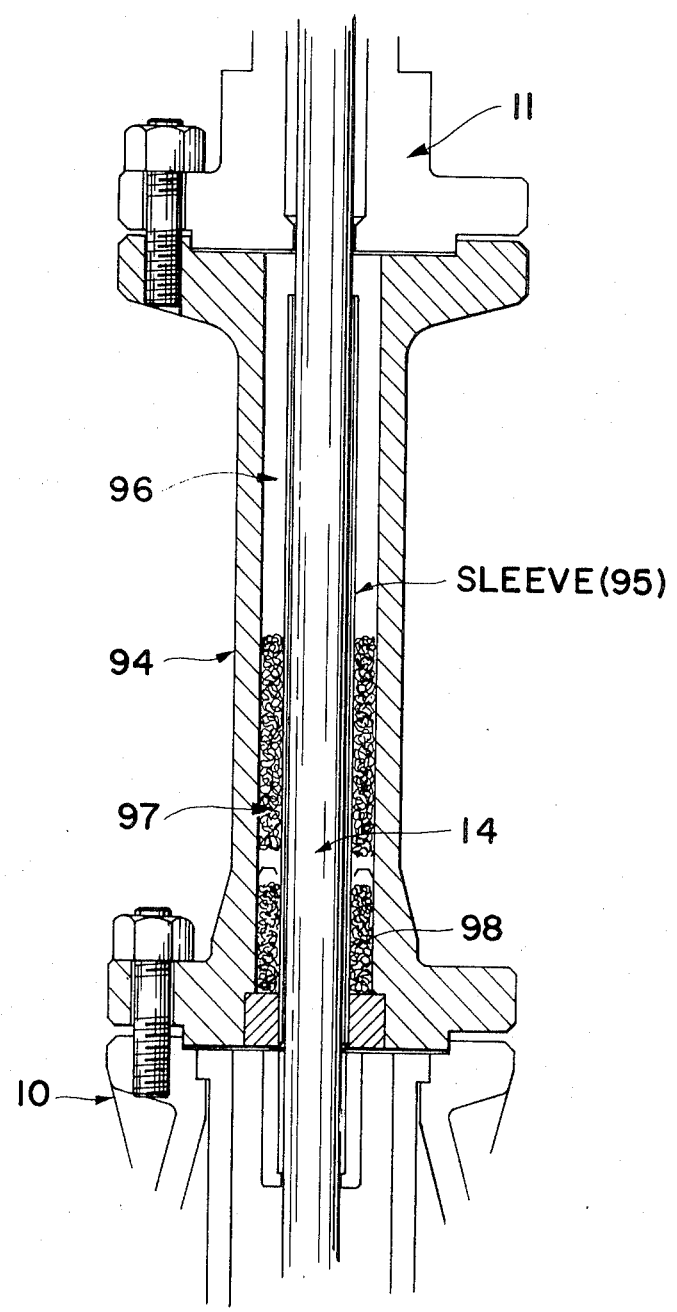
FIG. 25 illustrates a bonnet packing renewal system.

The sub-assembly of FIGS. 24–25 illustrates a control valve cooling bonnet for high temperature flow use, for example, in steam lines.

Most valve packing is not suitable for high temperature application. Difficulties occur because process fluids circulate about the valve stem, adding heat faster than it is dissipated. This sub-assembly provides baffle structure, either solid or in the form of metal wool, in any case, heat conductive. Such baffle structure extends transversely across the area from adjacent the valve stem to the wall of the bonnet. This area is of the nature of the stem clearance which is otherwise used for packing. Such baffles are in the lower area of the bonnet structure. Thus vapor or steam condenses at the top, into an essentially non-circulating and low heat-conductive body of liquid. The baffles restrict circulation and conduct heat to the lower wall portion of the bonnet structure.

Thus the bonnet area of stem packing is kept sufficiently cool to protect the packing. It is not necessary to use less efficient high friction packing which is resistant to high temperatures. The top of the bonnet is thus safer for handling.

This device may be provided as one bonnet body as in FIG. 24 or as a cooling bonnet at the bottom, surmounted by a conventional bonnet, as in FIG. 25.

In FIG. 24, a bonnet 85 is mounted on the valve body 10, and, near the bonnet top, a fragment of the yoke 12 is shown as mounted on the bonnet 85.

The bonnet 85 has a central, vertically through passage through which the valve stem 14 extends. There is substantial clearance about the valve stem 14 throughout the through passage of the bonnet. This clearance is in cylindrical sleeve form. In the lower part of the bonnet, it has its largest diameter. In the upper part of the bonnet it has a lesser diameter. At an intermediate point in the length of the bonnet, this clearance has its least diameter, at 86, providing shoulders on which packing 87 in the upper bonnet is based, and as a terminus for baffles 88 in the lower bonnet.

The packing 87 is based on a scraper ring assembly 89 and is secured at the top by a conventional packing gland 60. This packing situation is by way of example. Other forms may be used as desired.

In high temperature situations of fluid being flow controlled, such as steam, the packing 87 and the top of the bonnet must be kept at a lower temperature than the steam, to save the packing from destruction, and to keep the top of the bonnet safe for handling and from transmitting damaging heat up to the actuator through the yoke 12 or the stem 14.

The lower bonnet baffles 88 accomplish this cooling in two ways. They physically inhibit circulation of hot fluid up and down the valve stem, and they conduct heat from the lower bonnet clearance area, to the side walls of the bonnet.

Each of the baffles 88 comprises a base ring 90 with a conical top 91, open at the top to receive the valve stem 14, with a small clearance 92 adjacent the stem. The base ring of each baffle nests over the conical top of the baffle next below it. Spacers like that at 93 may be used to vary the location and degree of baffle effect in the column of baffles.

The baffle clearances 92 provide a thin sleeve passage for fluid to follow up the valve stem. Condensation and baffle trapping of fluid occurs. Circulation is inhibited, and the lower part of the bonnet thus becomes a heat trap.

In the structure of FIG. 25, a heat trap bonnet 94 is mounted on the valve body 10, with a conventional form of bonnet 11 top end mounted on the heat trap bonnet 94. The bonnet 11 is thus kept at an acceptable operating temperature. The bonnet 11 is provided with a thin sleeve 95 about the valve stem 14 with a fluid passage clearance to allow steam to rise around the stem. The sleeve 95 terminates short of the top of the bonnet. Condensation occurs there and a body of liquid forms in the top area 96 within the bonnet 94, outside the sleeve 95.

The bottom area 97 of the bonnet stem clearance opening is filled with fibrous metal such as stainless steel wool 98. This material traps condensate and steam to prevent circulation and conducts heat to the walls of the bonnet. Suitably arranged, a body of liquid is trapped in the top portion 98, supported by a bubble of steam in the bottom portion 97. As alternative structure, U-shaped aluminum baffles 98 may be used in a stack, or mixed in with the fibrous heat conducting metal 98. Thus radial heat transfer is encouraged and vertical heat transfer inhibited.

Figure 26:
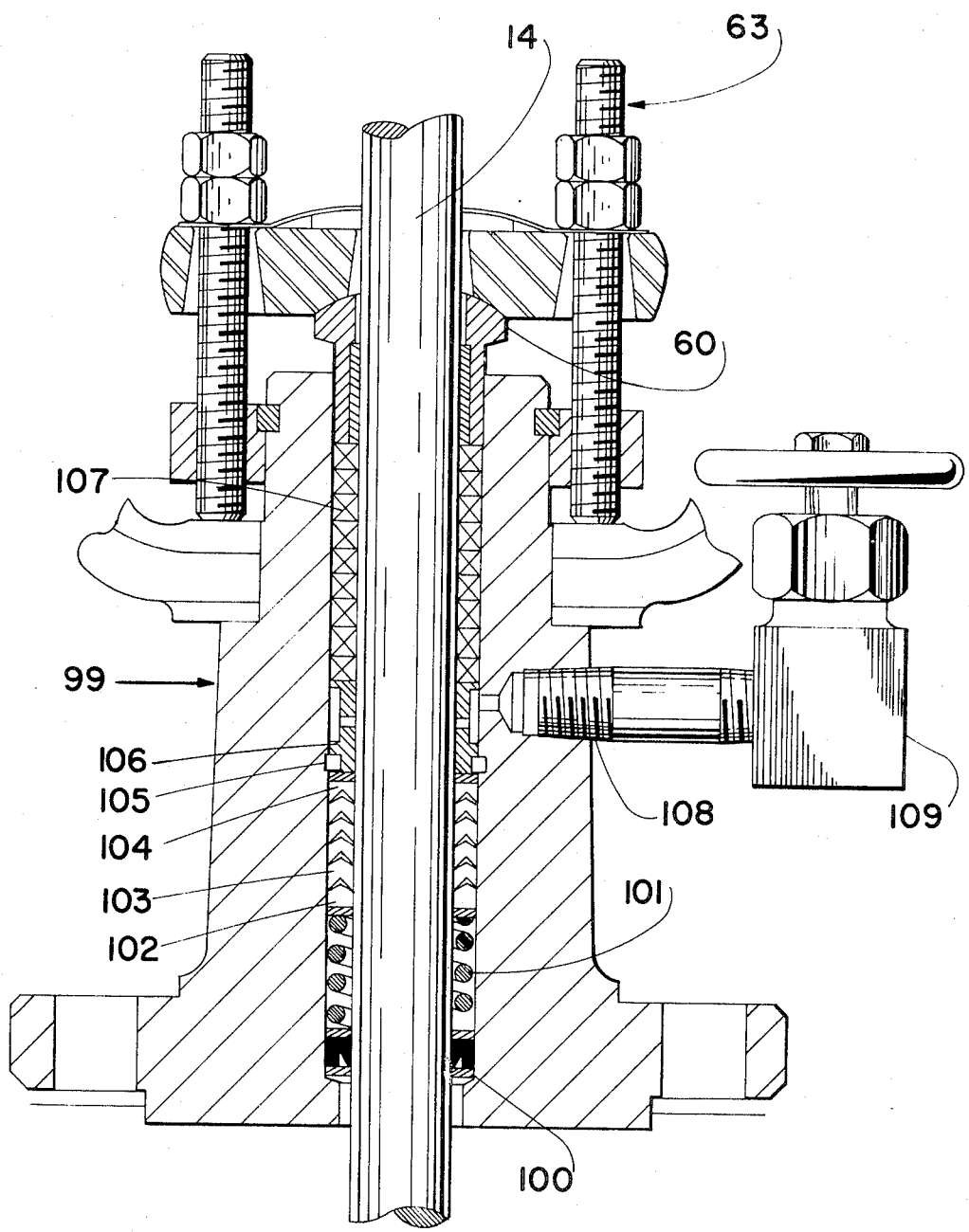
FIG. 26 illustrates a bonnet packing renewal system.

The FIG. 26 sub-assembly structure is a "piggy-back" stuffing box form of packing column, in a valve bonnet, around the valve stem. The purpose of this device is to give warning when initially used packing fails, and to provide means for renewing the valve stem packing effect without dismantling the valve or valve bonnet.

This is provided by a bottom column of packing which is tight and initially the only packing in effective use. At the top of this bottom column is a side leak-off through a valve which is left open. A top column of somewhat less tight, initially essentially unused packing is provided in the top portion of the bonnet. When the bottom packing fails, in months or years, leakage appears through the leak-off valve. When this occurs, the leak-off valve is closed by an operator, and the upper packing tightened, to provide renewal of effective operation of the overall valve bonnet packing, without dismantling or replacing the valve or bonnet.

Structure implementing the above packing renewal system is shown in FIG. 26 as a bonnet 99 mounted on the valve body 10. The bonnet 99 has the usual vertical passage therethrough, containing the valve stem 14 and a stem surrounding packing column.

This packing column, from the bottom up, comprises a washer, a scraper 100, another washer, a coil spring 101, another washer, a male adapter 102, a stack of crushable V packing rings 103, a female adapter 104, a split-ring 105 keyed into the wall of the bonnet as an anchor, a lantern ring 106, a column of auxiliary relatively loose packing 107, topped by the gland 60 and the gland flange 61 secured by bolts 63 as a means of later further compressing the auxiliary packing 107.

At the lantern ring 106 level, a side outlet passage 108 to an initially open valve 109 provides the leak capability which warns that the initially used packing 103 has failed. Then the valve 109 can be closed, and the bolts 63 can be closed, to renew the valve stem capability of the structure.

Figure 28:
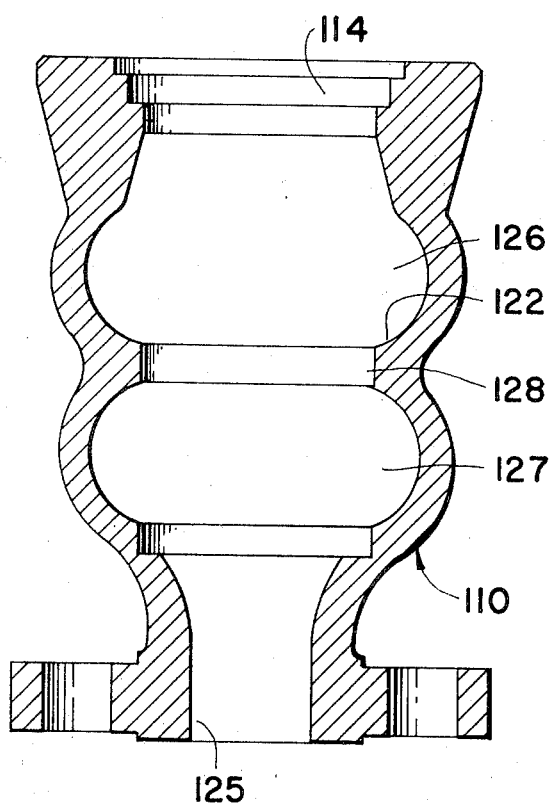
FIG. 28 illustrates the internal body form of the combination of FIG. 27.
Figure 27:
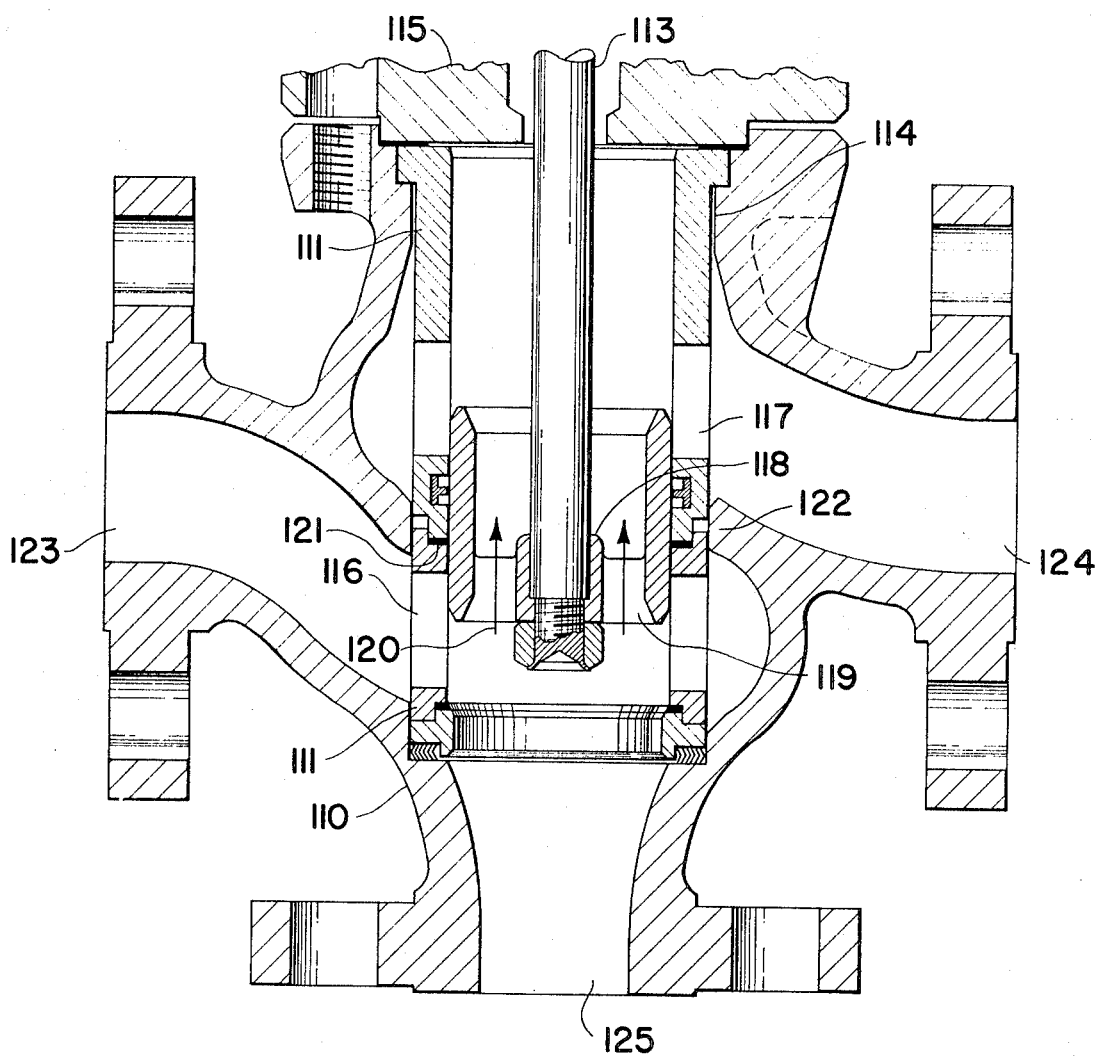
FIG. 27 illustrates a three-way valve body and plug combination.

The sub-assembly of FIGS. 27 and 28 is a three-way combination of valve body and valve plug. This system combines in one structure the capability of a stream splitter, one flow stream into two streams, with the capability of a flow stream mixer, two streams into one. Which capability is in effect depends on how the valve body ports are connected, that is, whether the input is one stream for splitting, or two streams, for mixing, both on a proportional basis.

The structure combines a valve plug with passages therethrough in the nature of a balanced valve plug, and a cage formation with two sets of openings.

The FIG. 27 structure comprises a valve body 110, a cage 111, and a valve plug 112 secured to and operated through a valve stem 113.

The body 110 is provided with an access opening 114 for receiving the stem 113. This opening is closed by the lower portion of a bonnet 115. This structure holds the cage 111 in a drop-in assembly in the manner of structures discussed hereinbefore.

The cage 111 has a lower set of side wall ports 116 and an upper set of side wall ports 117. The plug 112 is a sleeve, piston-mounted within the cage 111. The stem 113 is secured to a central boss 118 of the cage, the boss 118 being supported by ribs 119. Thus the plug is open to lengthwise flow therethrough, past the ribs 119, at all times. The plug in its movement within the cage, can close off either the top cage ports 117, or the bottom cage ports 116, but not passages through the plug, indicated by arrows 120.

The cage 111 may be a unitary structure or one cage endmounted on another, as indicated by the juncture 121. In either case, the cage structure extends through and is laterally supported by a valve body bridge 122. Suitable seals may be used, as shown, between the cage and the plug, and between the cage and the internal body bridge 122.

The body 110 is provided with two side ports, at 123 and 124, and a bottom port 125. The bottom port 125 is always flow connected to either or both body ports 123 and 124. As shown, with the plug 112 midway of its movement, both body ports 123 and 124 are partially open to each other and to the body port 125. For stream splitting, the input stream may be applied to any body port and the other two ports will exit the split streams. For stream mixing, the input streams may be applied to any two body ports, and the mixed stream will exit from the third body port.

The internal body form of the valve structure of FIG. 27 is shown in FIG. 28. The upper annular chamber 126 connects the cage ports 117 with the body port 124. The lower annular chamber 127 connects the cage ports 116 with the body port 123. These chambers are connected to each other and to the body port 125 through an opening 128 in the body internal bridge 128. With the valve plug 112 within the cage, chambers 126 and 127 are selectively connected to each other and the body ports, through the plug passages 120, according to the location of the plug up and down, within the cage.

This invention, therefore, provides significant improvement in valve and valve product line structure, form, and performance, based on computer aided design, streamlined and fulsome passages and chambers, simplicity in cage assemblies, and other structural improvements, especially such that lend themselves to the provision of interchangeable parts and reduced number of parts in a superior valve product line, including disclosure of sub-assemblies.

As many embodiments may be made of the above invention and as changes may be made in the embodiment set forth above without departing from the scope of the invention, it is to be understood that all matter hereinbefore set forth and in the accompanying drawings is to be interpreted as illustrative only and not in a limiting sense.

I claim:

1. A flow control valve structure comprising a valve body with a valve aperture in a central area therein, a ring shoulder about said aperture, and input and output flow passages to and from said area, a valve bonnet mounted on said body, and an internal assembly within said body, said internal assembly comprising a valve seat ring resting in said body on a seat ring gasket on said ring shoulder without attachment to said body, a cylindrical sleeve cage having side wall flow openings therethrough, said cage with one end pressuring said seat ring into place by pressure from said bonnet on the other end of said cage, and a valve plug and stem assembly mounted for movement within said cage, with said plug movement being with respect to said seat ring, to vary the flow passage size of said aperture, said cage having interior guide means within said body for guiding said movement of said plug and stem assembly, said valve body having an opening for loosely receiving said cage, with said bonnet and said other end of said cage having mutually matching flat end surface forms in engagement through a gasket, means for securing said bonnet to said body at points radially outside of said body opening whereby simple assembly and disassembly is provided of said body, bonnet, and internal assembly, with respect to each other, said valve structure thus comprising a series of loosely fitting building blocks, easily assembled and disassembled, yet tightly held together by said securement of said bonnet to said body, with proper alignment of said plug and stem assembly due to said cage interior guide means, said building blocks comprising said seat ring in said valve body, said cage in said valve body with one end pressuring said seat ring into place, and said bonnet boss, through which pressure is applied to said seat ring by way of said cage, said seat ring having a top surface step form;

said cage having a bottom surface step form in nesting alignment with said seat ring top surface step form, with the step treads of said cage respectively overlying the step treads of said seat ring;

said seat ring having a bottom surface step form, the step treads of which both at least partially overlie said ring shoulder about said valve aperture;

a yoke and a packing gland flange on said bonnet; and a pair of fasteners, each of which is used to secure both said yoke and said packing gland flange to said bonnet.

2. A flow control valve according to claim 1, wherein the construction of the valve is such, including the sufficiency and form of the flow passages and chambers, that the same flow rates are obtained for a given size valve with full area trim, for both stem and cage guided types, balanced or direct, and whether set up with percentage or linear characteristics.

3. A flow control valve according to claim 1, wherein said valve aperture is variable in size as the plug is moved, to produce a calculated $C_v$ percentage curve of operation to a high degree of performance by means of structural curve form as part of said aperture, said curve form having been shaped by minute shaping steps according to computer aided design referenced to an empirically ideal $C_v$ percentage curve.

4. A flow control valve according to claim 3, wherein the input flow passage to said valve aperture area is continuously increased in volume and the output flow passage from said area is continuously decreased in volume, in streamline and volumetric support of said high degree of performance.

5. A valve structure according to claim 1, wherein the general form is selected from the types: stem guided valves, cage guided valves, and needle trim valves.

6. A valve structure according to claim 1, wherein a soft seat valve is provided by simple insertion of a soft seat ring between the cage and the seat ring.

7. A valve structure according to claim 1, wherein the plug and stem assembly is formed as a permanent unit by forcing material of one of the plug and stem units into locked relation with respect to the other.

8. A valve according to claim 1, in the form of a stem-guided plug valve in which the cage is an assembly support device with a central, stem-guiding portion.

9. A valve according to claim 1, wherein trim changes are made simply by disengaging the bonnet and body and substituting parts, such as valve seats, within the valve body.

10. A product line of valves according to claim 1, of different types, trims, sizes, and characterization wherein, due to the building block structure, the product line is maximal in application and minimal in the necessary numbers of parts needed for on-shelf stocking.

11. A flow control valve structure according to claim 1, wherein the bonnet is provided with a single size of yoke-mounting external diameter portion for each of a series of different size valves.

12. A flow control valve structure according to claim 1, wherein a valve stem opening is provided through the bonnet of a sufficient size to provide for the use of different stem sizes by changing the packing size around the stem and in the valve stem opening.

13. A flow control valve structure according to claim 1, wherein, with respect to the valve stem, a felt wiper and an outwardly convex wiper disc-clamp is provided on the outer end face of the packing gland flange to prevent dirt collecting cavity formation about the valve stem at its exit area with respect to the packing gland.

14. A flow control valve structure comprising a valve body with a valve aperture in a central area therein and input and output flow passages to and from said area, a valve bonnet mounted on said body, and an internal assembly within said body, said internal assembly comprising a valve seat ring resting in said body without attachment to said body, a cylindrical sleeve cage having side wall flow openings therethrough, said cage with one end pressuring said seat ring into place by pressure from said bonnet on the other end of said cage, and a valve plug and stem assembly mounted for movement within said cage, with said plug movement being with respect to said seat ring, to vary the size of said aperture, said cage having interior guide means within said body for guiding said movement of said plug and stem assembly, said valve body having an opening for loosely receiving said other end of said cage, said openings having an annular step recess for receiving a boss portion of said bonnet, said other end of said cage lying within said valve body at the level of the bottom of said step recess, with said bonnet boss and said other end of said cage having mutually matching flat end surface forms in engagement through a gasket, without extension of either said cage or bonnet into each other beyond said surface forms, means for securing said bonnet to said body at points radially outside of said body opening whereby simple assembly and disassembly is provided of said body, bonnet, and internal assembly, with respect to each other, said valve structure thus comprising a series of loosely fitting building blocks, easily assembled and disassembled, yet tightly held together by said securement of said bonnet to said body, with proper alignment of said plug and stem assembly due to said cage interior guide means, said building blocks comprising said seat ring in said valve body, said cage in said valve body with one end pressuring said seat ring into place, and said bonnet boss, also within said valve body, through which pressure is applied to said seat ring by way of said cage, wherein a pair of fasteners is provided, each of which is used to secure both a yoke and a packing gland flange to the bonnet.

15. In a stem-guided plug type valve, a seat ring, a sleeve cage pressuring said seat ring, and a valve bonnet pressuring said cage and to hold said cage pressure on said seat ring, said cage having a central shaft with an opening therethrough as a fixed guide for movement of a valve stem within the body of said valve.

16. A plug type valve according to claim 15, wherein by simple disassembly and reassembly, a soft seat ring may be readily and quickly mounted between said cage and the regular seat ring.

17. A valve assembly comprising a valve body, a seat ring counterbore of a first diameter, a bonnet counterbore of a second diameter, larger than said first diameter; a seat ring on a seat ring gasket, both in said seat ring counterbore; a cage in pressure applying relation to said seat ring to hold said seat ring in said seat ring counterbore; a bonnet, a central boss on an end of said bonnet and mounted in said bonnet counterbore in pressure applying relation with said cage, in aid of said cage pressure application to said seat ring, and a valve plug and stem assembly operationally mounted with respect to said seat ring, said bonnet being provided with a set of mounting bolts each securing to said bonnet both a yoke and a packing gland flange.

18. A valve assembly comprising a valve body, a seat ring counterbore of a first diameter, a bonnet counterbore of a second diameter, larger than said first diameter; a seat ring on a seat ring gasket, both in said seat ring counterbore; a cage in pressure applying relation to said seat ring to hold said seat ring in said seat ring counterbore; a bonnet, a central boss on an end of said bonnet and mounted in said bonnet counterbore in pressure applying relation with said cage, in aid of said cage pressure application to said seat ring, and a valve plug and stem assembly operationally mounted with respect to said seat ring, a mounting assembly on said bonnet comprising a yoke lock ring, a keyed split ring securing said yoke lock ring, a packing gland, a packing gland flange on said packing gland, and a set of bolts, each of said bolts securing both said flange to said bonnet and securing a yoke to said bonnet.

19. For use in a valve structure, a sleeve cage for mounting about a valve stem and plug as an assembly device, said cage having a central portion as a guide for said valve stem.

20. For use in a valve structure, a mounting assembly for a valve bonnet comprising a yoke lock ring, a split ring keyed into said bonnet as a securement for said yoke lock ring, a packing gland inserted in said valve bonnet, a packing gland flange on said packing gland, and a set of bolts, each of said bolts securing both said flange to said gland and said yoke to said bonnet.

21. A stem-guided plug type flow control valve for use in industrial systems, comprising a valve body, a valve bonnet mounted on said body, a valve yoke mounted on said bonnet, a valve cage and seat ring combination in said valve body, and a valve plug and stem assembly with said plug within said body in cooperation with said seat ring, said stem extending from said plug and through said bonnet into said yoke, said valve plug being movable, through actuation of said stem, with respect to said seat ring to provide variable aperture area in said valve;

said body comprising a valving opening for receiving said plug, a counterbore around said valving opening for receiving said seat ring with gasketing, an input flow passage to said valving opening in continuously increasing volume, an output passage from the area of said valving opening in continuously decreasing volume, a valve cage receiving counterbore of greater diameter than said valve seat counterbore, and a bonnet boss receiving counterbore of greater diameter than said valve cage counterbore;

said bonnet comprising an end boss mounted in said bonnet counterbore in said body, said end boss providing a flat wall interface with and within the interior of said valve body, a central opening through said bonnet for receiving said valve stem and packing around said valve stem, an external peripheral step form on said bonnet for receiving said yoke, a yoke lock ring, a split ring keyed in said bonnet as an anchor for said lock ring, a set of bolts threaded through said yoke lock ring for engaging and holding said yoke in said step form, a packing gland in the outer end of said bonnet, a packing gland flange holding said packing gland in said bonnet, said set of bolts also being the instrument of said flange holding, a felt wiper stem receiving ring on the outer side of said gland flange, and an outwardly convex wiper clamp ring over said felt wiper;

said valve and seat ring combination comprising a valve seat ring in said body seat ring counterbore, a sleeve cage mounted on said seat ring, with a cage flange mounted in said body cage counterbore, said cage having side wall openings for fluid exit flow from said valve aperture, and a central stem guide boss, the interior of said cage being dead ended with said body along said stem by the end face of said bonnet boss; and said plug and stem assembly comprising a computer contoured plug within said seat ring, and a stem threaded into one side of said plug, with material of said plug turned into a peripheral slot in said stem to permanently lock said plug to said stem.

22. A stem-guided, plug type, needle trim valve for use in industrial systems, comprising a valve body, a valve bonnet mounted on said body, a valve yoke mounted on said bonnet, a valve cage and seat ring combination in said valve body, and a valve plug and stem assembly with said plug within said body in cooperation with said seat ring, said stem extending from said plug and through said bonnet into said yoke, said valve plug being movable, through actuation of said stem, with respect to said seat ring to provide variable aperture area in said valve;

said body comprising a valving opening for receiving said plug, a counterbore around said valving opening for receiving said seat ring with gasketing, an input flow passage to said valve opening in continuously increasing volume, an output passage from the area of said valving opening in continuously decreasing volume and a bonnet boss receiving counterbore of greater diameter than said seat ring counterbore;

said bonnet comprising an end boss mounted in said bonnet counterbore in said body, said end boss providing a flat wall interface with and within the interior of said valve body, a central opening through said bonnet for receiving said valve stem and packing around said valve stem, an external peripheral step form on said bonnet for receiving said yoke, a yoke lock ring, a split ring keyed in said bonnet as an anchor for said lock ring, a set of bolts threaded through said yoke lock ring for engaging and holding said yoke in said step form, a packing gland in the outer end of said bonnet, a packing gland flange holding said packing gland in said bonnet, said set of bolts also being the instrument of said flange holding, a felt wiper stem receiving ring on the outer side of said gland flange, and an outwardly convex wiper clamp ring over said felt wiper;

said valve and seat ring combination comprising a valve seat ring in said body seat ring counterbore, a sleeve cage mounted on said seat ring, said cage having side wall openings for fluid exit flow from said valve aperture, a central stem guide area, a scraper ring for receiving said stem and mounted in said stem guide area, said stem guide area and said scraper ring providing a dead ended chamber along said stem and within said cage; and said plug and stem assembly comprising a computer contoured plug within said seat ring, and a stem threaded into one side of said plug, with material of said plug turned into a peripheral slot in said stem to permanently lock said plug to said stem.

23. A cage guided flow control valve for use in industrial systems, comprising a valve body, a valve bonnet mounted on said body, a valve yoke mounted on said bonnet, a valve cage and seat ring combination in said valve body, and a valve plug and stem assembly with said plug within said body in cooperation with said seat ring, said stem extending from said plug and through said bonnet into said yoke, said valve plug being movable, through actuation of said stem, with respect to said seat ring to provide variable aperture area in said valve;

said body comprising a valving opening for receiving said plug, a counterbore around said valving opening for receiving said seat ring with gasketing, an input flow passage to said valving opening in continuously increasing volume, an output passage from the area of said valving opening in continuously decreasing volume, a valve cage receiving counterbore of greater diameter than said valve seat counterbore, and a bonnet boss receiving counterbore of greater diameter than said valve cage counterbore;

said bonnet comprising an end boss mounted in said bonnet counterbore in said body, said end boss providing a flat wall interface with and within the interior of said valve body, a central opening through said bonnet for receiving said valve stem and packing around said valve stem, an external peripheral step form on said bonnet for receiving said yoke, a yoke lock ring, a split ring keyed in said bonnet as an anchor for said lock ring, a set of bolts threaded through said yoke lock ring for engaging and holding said yoke in said step form, a packing gland in the outer end of said bonnet, a packing gland flange holding said packing gland in said bonnet, said set of bolts also being the instrument of said flange holding, a felt wiper stem receiving ring on the outer side of said gland flange, and an outwardly convex wiper clamp ring over said felt wiper;

said valve and seat ring combination comprising a valve seat ring in said body seat ring counterbore, a sleeve cage mounted on said seat ring, with a cage flange mounted in said body cage counterbore, said cage having side wall openings computer contoured for cooperation with said plug in controlled exit flow of fluid from said valve aperture, and a central stem guide boss, the interior of said cage being dead ended within said body along said stem by the end face of said bonnet boss; and said plug and stem assembly comprising a cylindrical plug fitted for piston movement within said cage, and a stem threaded in and extending through said plug, said stem having an end nut against said plug, with a portion of the end of said stem turned over on said nut, in permanent locking relation therewith.

24. A flow control valve structure comprising a valve body, a valve bonnet mounted on said body, an interior flow passage system in said valve body, a bridge across said passage system into input and output portions, a valve aperture opening through said bridge, a nested assembly of a valve cage and a valve seat ring mounted about said bridge opening, and a valve stem and plug assembly mounted for valve aperture area change within said cage, wherein a valve aperture configuration is provided in terms of computer aided design, said input passage portion having a circular form at its inception, leading into an oval form having one dimension essentially equal to the diameter of said circular form and another dimension essentially equal to twice said diameter, said output passage portion having length which in form and dimension reverses that of said input passage portion, said input passage portion, immediately adjacent said bridge, having a depth at least equal to the diameter of said inception form, and said output passage portion, immediately adjacent said cage, having depth in a direction away from said cage, essentially equal to a radius of said inception form.

25. A flow control valve structure comprising a valve body, a valve bonnet mounted on said body, an interior flow passage system in said valve body, a bridge across said passage system into input and output portions, a valve aperture opening through said bridge, a nested assembly of a valve cage and a valve seat ring mounted about said bridge opening, and a valve stem and plug assembly mounted for valve aperture area change within said cage, wherein a valve aperture configuration is provided in terms of computer aided design, said structure having inner chambered form in the nature of a relatively large globe resting on a relatively small globe, with said bridge between said globes, in which said small globe has a diameter essentially equal to that of the inception of said input passage portion, and in which said larger globe has a peripheral form radiused in depth away from said cage essentially equal to the radius of said inception of said input passage, said small globe being centered essentially on a center line through said valve body and bonnet, and said larger globe depth being centered essentially in the wall of said cage.

26. A flow control valve structure comprising a valve body, a valve bonnet on said body, and an interior assembly in said body comprising a valve sleeve cage in otherwise unsecured nested stack assembly on a valve seat ring, held by said bonnet, and a valve stem and plug combination mounted for valving operation within said cage, said stem and plug combination being provided with stem guidance means both in said bonnet and in said body.

27. A flow control valve structure comprising a valve body, a valve bonnet on said body, and an interior assembly in said body comprising a valve sleeve cage in otherwise unsecured nested stack assembly on a valve seat ring, held by said bonnet, and a valve stem and plug combination mounted for valving operation within said cage, said cage being provided with a central, valve stem guide portion, within said body.

28. A flow control valve structure comprising a valve body, a valve bonnet on said body, a yoke and packing gland flange on said bonnet, a pair of fasteners each of which is used to secure both said yoke and said packing gland flange to said bonnet, and an interior assembly in said body comprising a valve sleeve cage in otherwise unsecured nested stack assembly on a valve seat ring, held by said bonnet, and a valve stem and plug combination mounted for valving operation within said cage, said cage and seat ring combination being provided with a readily removable soft seat ring between said cage and said seat ring to establish a soft seat valve.

29. A flow control valve structure comprising a valve body, a valve bonnet on said body, and an interior assembly in said body comprising a valve cage in otherwise unsecured nested stack assembly on a valve seat ring, held by said bonnet, and a valve stem and plug combination mounted for valving operation within said cage, said bonnet being provided with the same exterior peripheral dimension for each of a series of different size valves, whereby the same size yoke may be used with each of said different size valves.

30. A flow control valve structure comprising a valve body, a valve bonnet on said body, and an interior assembly in said body comprising a valve cage in otherwise unsecured nested stack assembly on a valve seat ring, held by said bonnet, and a valve stem and plug combination mounted for valving operation within said cage, a packing gland flange and a yoke are secured to said bonnet by a pair of bolts, each of said bolts being used to secure both said yoke and said packing gland flange to said bonnet.

* * * * *